(12) United States Patent  
Fan et al.

(10) Patent No.: US 9,264,972 B2
(45) Date of Patent: Feb. 16, 2016

(54) HOME NETWORKING WITH INTEGRATED CELLULAR COMMUNICATION

(71) Applicant: QUALCOMM Incorporated, San Diego, CA (US)

(72) Inventors: Mingxi Fan, San Diego, CA (US); George Cherian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 265 days.

(21) Appl. No.: 13/912,113

(22) Filed: Jun. 6, 2013

(65) Prior Publication Data

US 2013/0329714 A1    Dec. 12, 2013

Related U.S. Application Data

(60) Provisional application No. 61/658,285, filed on Jun. 11, 2012, provisional application No. 61/798,487, filed on Mar. 15, 2013.

(51) Int. Cl.

| | |
|---|---|
| *H04W 40/12* | (2009.01) |
| *H04W 88/06* | (2009.01) |
| *H04W 88/10* | (2009.01) |
| *H04W 48/00* | (2009.01) |
| *H04L 12/54* | (2013.01) |
| *H04W 72/08* | (2009.01) |
| *H04W 72/12* | (2009.01) |

(52) U.S. Cl.
CPC ........... *H04W 40/12* (2013.01); *H04L 12/5692* (2013.01); *H04W 48/00* (2013.01); *H04W 72/085* (2013.01); *H04W 72/087* (2013.01); *H04W 72/1226* (2013.01); *H04W 88/06* (2013.01); *H04W 88/10* (2013.01); *H04L 2212/00* (2013.01)

(58) Field of Classification Search
None
See application file for complete search history.

(56) References Cited

U.S. PATENT DOCUMENTS

| | | |
|---|---|---|
| 7,817,615 B1 | 10/2010 | Breau et al. |
| 2006/0233175 A1* | 10/2006 | Ge et al. ................... 370/392 |
| 2008/0137556 A1 | 6/2008 | Park et al. |

(Continued)

FOREIGN PATENT DOCUMENTS

WO    2011088612 A1    7/2011

OTHER PUBLICATIONS

International Search Report and Written Opinion—PCT/US2013/044789—ISA/EPO—Sep. 12, 2013.

(Continued)

*Primary Examiner* — Kerri Rose
(74) *Attorney, Agent, or Firm* — Arent Fox LLP

(57) ABSTRACT

A method, an apparatus, and a computer program product for wireless communication are provided. The apparatus may be an intermediate gateway. The intermediate gateway may receive a first Internet protocol (IP) packet of a first data flow for transmission to a device, determine a first quality of a cellular communication link established with the device and a second quality of at least one local area communication link established with the device, attach a header to the first IP packet when the second quality is closer to a quality requirement of the first IP packet than the first quality, the header being used to tunnel the first IP packet to the device via the at least one local area communication link, and transmit the first IP packet to the device via the at least one local area communication link based on at least the first and second qualities.

64 Claims, 19 Drawing Sheets

(56) References Cited

U.S. PATENT DOCUMENTS

| | | |
|---|---|---|
| 2008/0192925 A1* | 8/2008 | Sachs et al. .................... 380/29 |
| 2010/0046455 A1* | 2/2010 | Wentink et al. ............... 370/329 |
| 2011/0044218 A1* | 2/2011 | Kaur et al. .................... 370/310 |
| 2011/0044240 A1 | 2/2011 | Jang et al. |
| 2011/0085457 A1 | 4/2011 | Chen et al. |
| 2011/0170496 A1 | 7/2011 | Fong et al. |
| 2012/0106507 A1 | 5/2012 | Venkataswami et al. |
| 2012/0140743 A1 | 6/2012 | Pelletier et al. |
| 2012/0307761 A1 | 12/2012 | Zhang et al. |
| 2012/0314593 A1 | 12/2012 | Liu |
| 2012/0327894 A1 | 12/2012 | Axmon et al. |
| 2013/0003604 A1 | 1/2013 | Blankenship et al. |
| 2013/0053029 A1 | 2/2013 | Anchan |
| 2013/0080612 A1* | 3/2013 | Armstrong et al. ........... 709/223 |
| 2013/0308597 A1* | 11/2013 | Murphy et al. ............... 370/331 |

OTHER PUBLICATIONS

3GPP TS 22.278 V8.5.0 (Jun. 2008), 3rd Generation Partnership Project; Technical Specification Group Services and System Aspects; Service requirements for the Evolved Packet System (EPS) (Release 8), pp. 1-21.

* cited by examiner

HOME NETWORKING WITH INTEGRATED CELLULAR COMMUNICATION

CROSS-REFERENCE TO RELATED APPLICATIONS

This application claims the benefit of U.S. Provisional Application Ser. No. 61/658,285, entitled "HOME NETWORKING WITH INTEGRATED CELLULAR COMMUNICATION" and filed on Jun. 11, 2012, and claims the benefit of U.S. Provisional Application Ser. No. 61/798,487, entitled "HOME NETWORKING WITH INTEGRATED CELLULAR COMMUNICATION" and filed on Mar. 15, 2013, which are expressly incorporated by reference herein in their entireties.

BACKGROUND

1. Field

The present disclosure relates generally to communication systems, and more particularly, to home networking with integrated cellular communication.

2. Background

Home networking allows multiple devices, such as computers and other computing devices, to conveniently share files, printers and an Internet connection. Home networking solutions typically implement wireless local area network (WLAN) communication technologies, such as WiFi™, for transferring data and other information. However, such communication technologies are susceptible to interference from other networks that may be operating nearby, which may degrade the performance of the home network.

SUMMARY

In an aspect of the disclosure, a method, a computer program product, and an apparatus are provided. The apparatus may be an intermediate gateway. The intermediate gateway may receive a first Internet protocol (IP) packet of a first data flow for transmission to a device, determine a first quality of a cellular communication link established with the device and a second quality of at least one local area communication link established with the device, attach a header to the first IP packet when the second quality is closer to a quality requirement of the first IP packet than the first quality, the header being used to tunnel the first IP packet to the device via the at least one local area communication link, and transmit the first IP packet to the device via the at least one local area communication link based on at least the first and second qualities.

In an aspect of the disclosure, a method, a computer program product, and an apparatus are provided. The apparatus may be a device, such as a computing device. The apparatus generates a first IP packet to be transmitted to a cellular network, the cellular network in communication with an intermediate gateway, determines a first quality of a cellular communication link established with the intermediate gateway and a second quality of at least one local area communication link established with the intermediate gateway, attaches a first header to the first IP packet when the second quality is closer to a quality requirement of the first IP packet than the first quality, the first header being used to tunnel the first IP packet to the cellular network via the at least one local area communication link, and transmits the first IP packet to the cellular network via the at least one local area communication link based on at least the first and second qualities.

DETAILED DESCRIPTION

Figure 1:
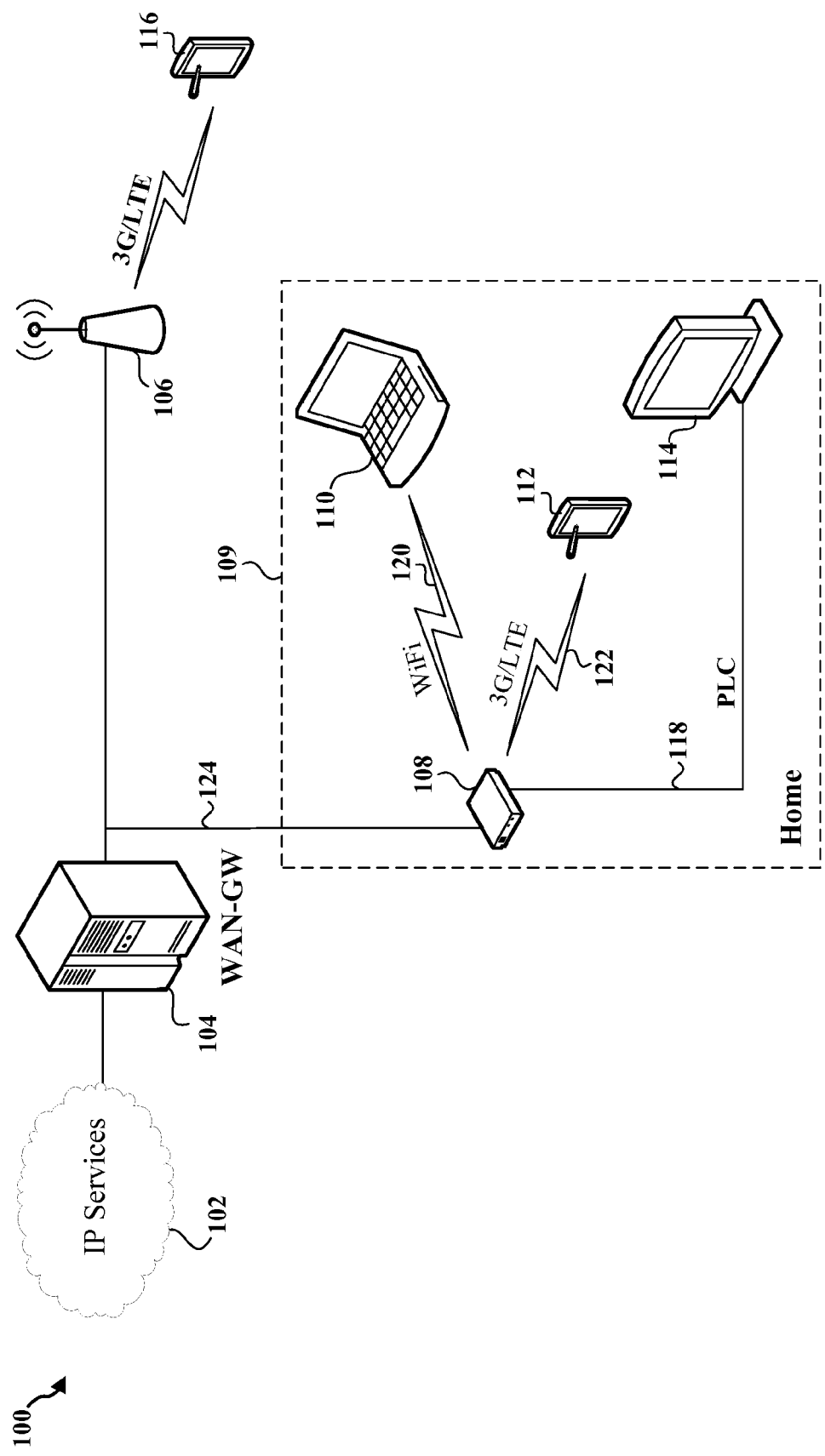
FIG. 1 is a diagram illustrating a communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating a communication system 100. The communication system 100 includes IP services 102, wide area network gateway (WAN-GW) 104, evolved Node B (eNB) 106, home access point (AP) 108, and devices 110, 112, 114 and 116. The home AP 108 may be a multimode AP configured to communicate with one or more devices using various network communication technologies. In the configuration of FIG. 1, the home AP 108 may communicate with one or more devices using a local area network (LAN) technology, such as a WLAN (e.g., WiFi™), Multimedia over Coax Alliance (MoCA™), power line communication (PLC), and Ethernet. The home AP 108 may further communicate with one or more devices using a wide area network (WAN) technology (e.g., cellular communications), such as 3G or Long Term Evolution (LTE), and may serve as a femtocell. As discussed infra, the home AP 108 may select one or more network communication technologies to communicate with the one or more devices (e.g., devices 110, 112, 114 and/or 116).

In the configuration of FIG. 1, device 110 is in communication with the home AP 108 via the WiFi™ link 120, device 112 is in communication with the home AP 108 via the cellular link 122, and device 114 is in communication with the home AP 108 via the PLC link 118. In an aspect, device 110 is a personal computer, device 112 is a cellular telephone, and device 114 is a television. For example, devices 110, 112, and 114 may be located inside a home 109 (e.g., as indicated by the dashed line in FIG. 1) and in proximity to the home AP 108.

In the configuration of FIG. 1, the backhaul is provided to the home AP 108 by the mobile operator (e.g., fixed wireless terminal (FWT), femtocell backhaul) via communication line 124. In an aspect, the home AP 108 may be configured to determine an optimal communication link for communication with the devices 110, 112, and 114. In another aspect, a device (e.g., device 110, 112, or 114) may be configured to determine an optimal communication link for communication with the AP 108 with parameters received via a cellular link and/or a local connection (e.g., WLAN, PLC, MoCA, and/or Ethernet).

Figure 2:
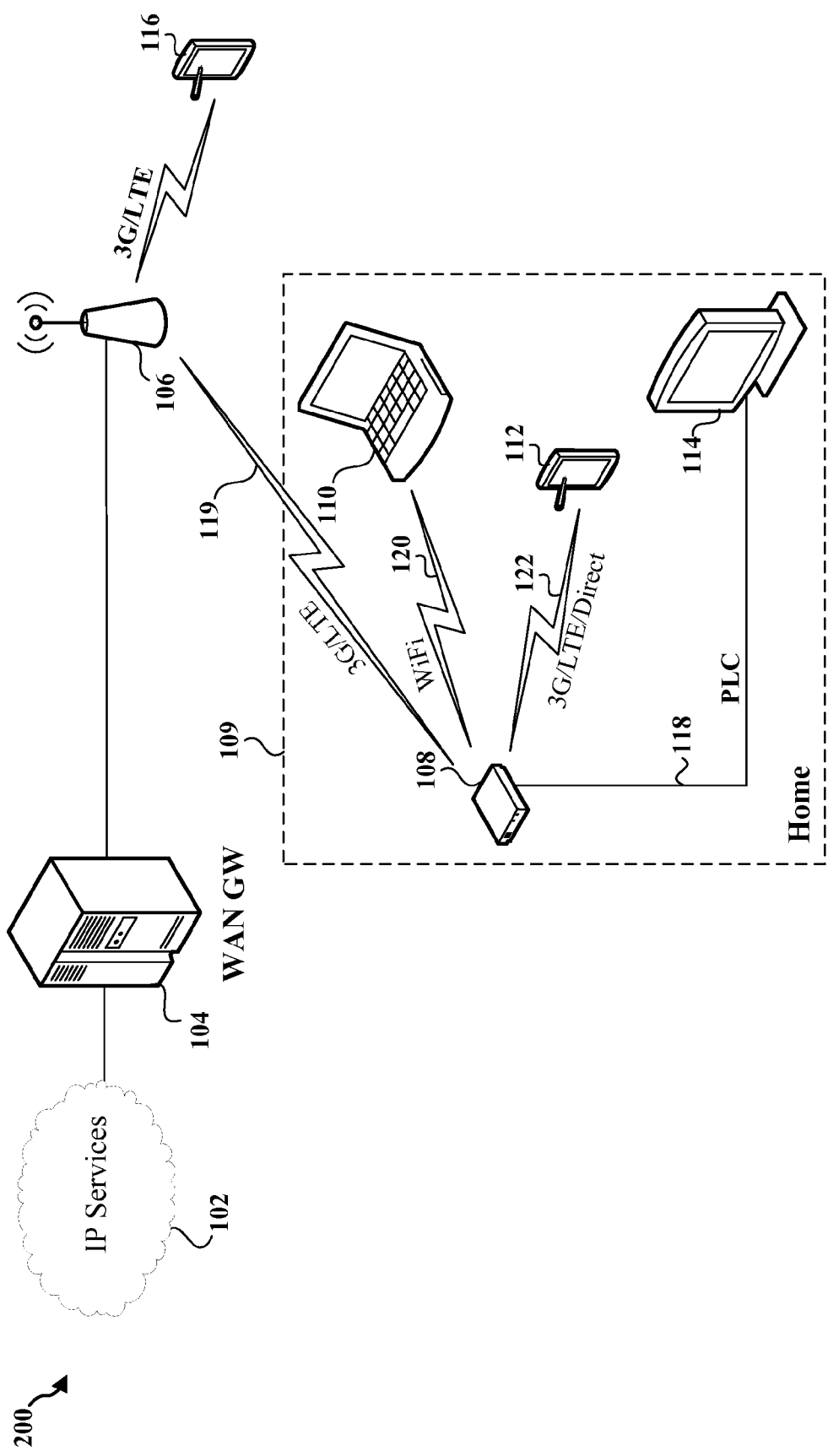
FIG. 2 is a diagram illustrating a communication system.

FIG. 2 is a diagram illustrating a communication system 200. In the configuration of FIG. 2, a local network connection may be established between the home AP 108 and the devices 110, 112, and 114. For example, device 110 is in communication with the home AP 108 via the WiFi™ link 120, device 112 is in communication with the home AP 108 via the cellular link 122, and device 114 is in communication with the home AP 108 via the PLC link 118. For example, the cellular link 122 may be based on a cellular communication technology, such as 3G, LTE, or LTE-Direct.

In the communication system 200, the backhaul is provided to the home AP 108 by the WAN via cellular communication link 119 established with the eNB 106. In an aspect, the home AP 108 may be configured to determine an optimal communication link for communication with the devices 110, 112, and 114. In another aspect, a device (e.g., device 110, 112, or 114) may be configured to determine an optimal communication link for communication with the AP 108 with parameters received via a cellular link and/or a local connection (e.g., WLAN, PLC, MoCA, and/or Ethernet).

Figure 3:
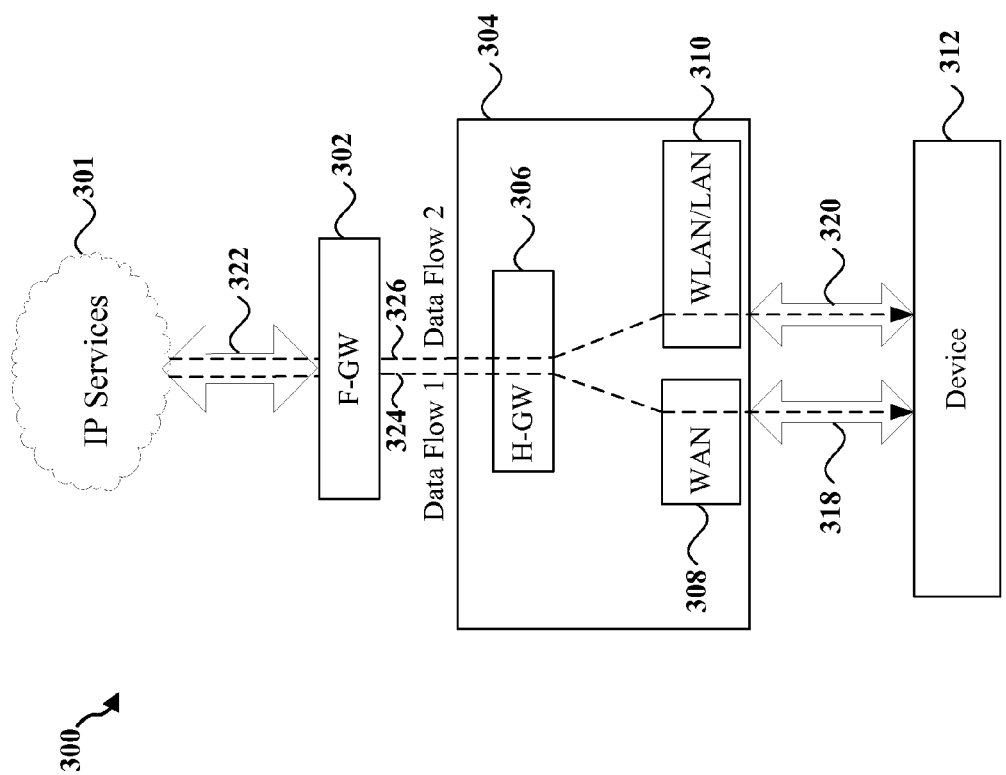
FIG. 3 is a diagram illustrating an architecture of a communication system.

FIG. 3 is a diagram illustrating an architecture of a communication system 300. The communication system 300 includes IP services 301, femtocell gateway (F-GW) 302, home AP 304, and device 312. For example, the device 312 may be a smartphone, a laptop computer, or any other suitable device. As shown in FIG. 3, the home AP 304 includes home gateway (H-GW) 306, WAN interface 308, and WLAN/LAN interface 310. In the configuration of FIG. 3, a femtocell access point (FAP) is integrated into the H-GW 306.

As shown in FIG. 3, the H-GW 306 may receive two or more separate data flows over a logical link 322, such as data flow 1 324 and data flow 2 326, from the IP services 301 via the F-GW 302. In one configuration, the data flow 1 324 and the data flow 2 326 may each include a stream of IP data packets that are to be delivered to the device 312 at an assigned IP address. As shown in FIG. 3, the data flow 1 324 and the data flow 2 326 from the IP services 301 may be aggregated at the H-GW 306 and routed to the device 312 using a transmission technology determined by the H-GW 306. In one aspect, the transmission technology for transmitting a data flow may be selected based on feedback indicating a quality of a communication link between an interface of the home AP 304 and the device 312. In the configuration of FIG. 3, data flow 1 324 is routed to the device 312 via the WAN interface 308 through cellular communication link 318. Data flow 2 326, however, is routed to the device 312 via the WLAN/LAN interface 310 over WLAN/LAN communication link 320.

In one aspect, the WAN interface 308 may be a radio communication interface based on cellular communication standards, such as Evolution-Data Only (EV-DO), CDMA2000 1×, LTE, or Universal Mobile Telecommunications System (UMTS). The WLAN/LAN interface 310 may include one or more communication interfaces. For example, the WLAN/LAN interface 310 may include a communication interface based on IEEE 802.11 standards, such as WiFi™; a PLC interface for carrying data on a conductor that is also used for electric power transmission; and/or a communication interface based on the Multimedia over Coax Alliance (MoCA™) standard.

Figure 4:
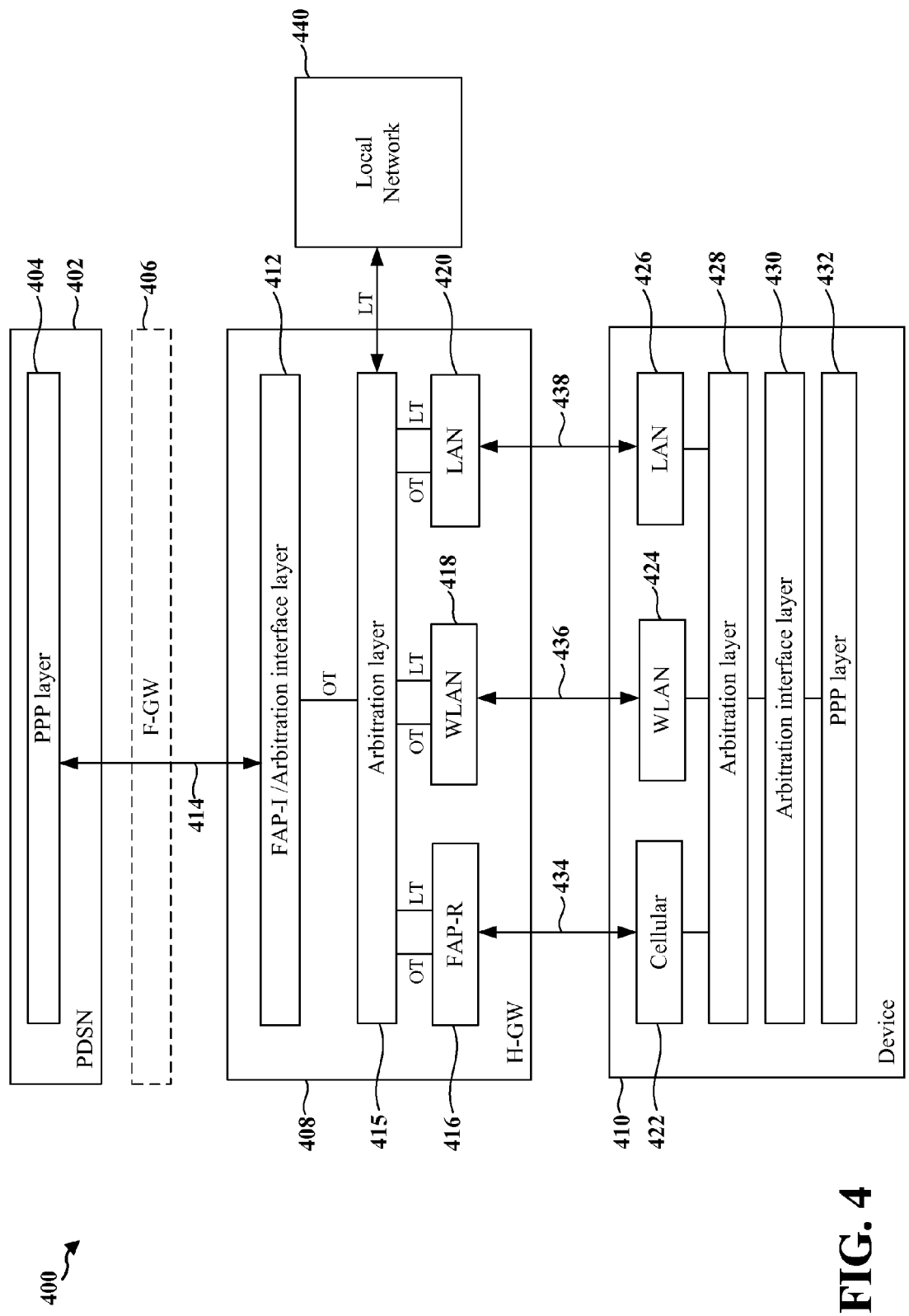
FIG. 4 is a block diagram illustrating a point-to-point protocol (PPP) data packet flow in a communication system.

FIG. 4 is a block diagram illustrating a PPP data packet flow in a communication system 400. Communication system 400 includes packet data service network (PDSN) 402, H-GW 408, and device 410. As shown in FIG. 4, PDSN 402 includes a PPP layer 404. H-GW 408 includes FAP interface (FAP-I)/arbitration interface layer 412, arbitration layer 415, femtocell access point radio (FAP-R) interface layer 416, WLAN interface layer 418, and LAN interface layer 420. For example, the WLAN interface layer 418 may apply a WLAN technology, such as WiFi™, and the LAN interface layer 420 may apply a LAN technology, such as MoCA™, PLC, Bluetooth™ and/or Ethernet.

Device 410 includes PPP layer 432, arbitration interface layer 430, arbitration layer 428, cellular interface layer 422, WLAN interface layer 424, and LAN interface layer 426. The FAP-I 412 and FAP-R 416 are separate logical entities of a FAP. The FAP-I 412 may serve as an interface to the core network (e.g., PDSN 402) and the FAP-R 416 may serve a radio air interface (e.g., cellular interface). For example, the device 410 may be a cellular telephone, a laptop computer, or other suitable communication device.

The H-GW 408 is in communication with the PDSN 402 via the logical link 414. In one configuration, the communication system 400 may include the F-GW 406, such that H-GW 408 may communicate with the PDSN 402 through the F-GW. The H-GW 408 is also in communication with the device 410 via cellular communication link 434, WLAN communication link 436, and LAN communication link 438. In one configuration, the PDSN 402 directly assigns an IP address to the device 410 and establishes a PPP session with the device 410.

Data packets generated by the PDSN 402 to be transmitted to the device 410 may be converted to PPP encapsulated packets at PPP layer 404. For example, PDSN 402 may generate a first PPP encapsulated IP packet that includes video data. The H-GW 408 may receive the first PPP encapsulated IP packet, and the arbitration layer 415 may identify an optimal interface from among the FAP-R interface layer 416, the WLAN interface layer 418, and the LAN interface layer 420 for transmitting the first PPP encapsulated IP packet to the device 410. Accordingly, the arbitration layer 415 arbitrates between different communication interface layers that may be used for transmission of PPP encapsulated IP packets from the PDSN 402.

In one configuration, the arbitration layer 415 may determine the optimal interface by determining a quality of each of the cellular communication link 434, the WLAN communication link 436, and the LAN communication link 438. The arbitration layer 415 may then select the interface layer corresponding to the communication link having the highest quality, a quality higher than a threshold, or a quality that is closest to a quality requirement of the first encapsulated IP packet. For example, in an aspect, if the first IP packet is a low latency packet (e.g., a voice over IP packet) that demands a particular quality of service ("QoS"), the arbitration layer 415 may select the interface layer corresponding to the communication link having a quality that is closest to satisfying the QoS requirements of the first IP packet in order to achieve optimum performance.

In another configuration, the PDSN 402 may send a message to the H-GW 408 indicating a preferred communication link established with the device (e.g., LAN communication link 438). In such a configuration, the H-GW 408 may transmit the first PPP encapsulated IP packet to the device 410 via the preferred communication link.

As shown in FIG. 4, the arbitration layer 415 is in communication with the FAP-I/arbitration interface layer 412 and the local network 440. For example, the local network 440 may be a network that is coupled to a local device, such as a printer. PPP encapsulated IP packets received from or transmitted to the PDSN 402 via the logical path 414, such as the previously discussed first PPP encapsulated IP packet, are herein referred to as cellular operator network routed traffic (also referred to as "operator network routed traffic" or "OT"). PPP encapsulated IP packets received from or transmitted to the local network 440 are herein referred to as local network traffic (also referred to as "LT"). Therefore, all PPP encapsulated IP packets of operator network routed traffic and local network traffic are integrated at the arbitration layer 415. As shown in FIG. 4, the arbitration layer 415 may communicate operator network routed traffic and local network traffic with the FAP-R interface layer 416, the WLAN interface layer 418, and the LAN interface layer 420.

In one aspect, the arbitration layer 415 may be configured to attach a header to one or more of the PPP encapsulated IP packets of operator network routed traffic received from the PDSN 402, such as the previously discussed first PPP encapsulated IP packet. In one configuration, the header may include a first media access control (MAC) identification (ID) that corresponds to an optimal interface selected by the arbitration layer 415, such as the WLAN interface layer 418. In such a configuration, the header allows mapping of PPP encapsulated IP packets of operator network routed traffic to the data flow on the WLAN communication link 418.

In another configuration, the header may include a second MAC ID different from the first MAC ID, where the second MAC ID corresponds to a different optimal interface selected by the arbitration layer 415, such as the LAN interface layer 420. In such a configuration, the PPP encapsulated IP packets of operator network routed traffic may be mapped to the data flow on the LAN communication link 438. Therefore, PPP encapsulated IP packets of operator network routed traffic may be tunneled over the WLAN communication link 436 and/or the LAN communication link 438 between the device 410 and the FAP-I/arbitration interface layer 412.

In one aspect, if the arbitration layer 415 receives a second PPP encapsulated IP packet from the local network 440, the arbitration layer 415 may determine that the WLAN interface layer 418 is the optimal interface for transmitting the second PPP encapsulated IP packet. The arbitration layer 415 may then attach a third header to the second PPP encapsulated IP packet. In one configuration, the third header may include a third MAC ID that corresponds to an optimal interface selected by the arbitration layer 415, such as the WLAN interface 418, where the third MAC ID is different from the first MAC ID. In another aspect, if the arbitration layer 415 determines that the LAN interface 420 is the optimal interface for transmitting the second PPP encapsulated IP packet, the arbitration layer 415 may attach a fourth header to the second PPP encapsulated IP packet. In one configuration, the fourth header may include a fourth MAC ID that corresponds to the optimal interface selected by the arbitration layer 415, such as the LAN interface 420, where the fourth MAC ID is different from the second MAC ID. Therefore, each communication interface layer (e.g., FAP-R interface layer 416, WLAN interface layer 418, LAN interface layer 420) of the HG-W 408 may be assigned two different MAC IDs, such that one MAC ID is assigned to operator network routed traffic and another MAC ID is assigned to local network traffic.

In one aspect, if the arbitration layer 415 determines that the FAP-R 416 is the optimal interface for transmitting the first and second PPP encapsulated IP packets, the arbitration layer 415 may use synchronous PPP ("SN-PPP") to transmit the first PPP encapsulated IP packet of operator network routed traffic, and may use asynchronous PPP ("AN-PPP") to transmit the second PPP encapsulated IP packet of local network traffic. In such aspect, the arbitration layer 415 may not attach a header that includes a MAC ID.

The device 410 may obtain an IP address of the operator network (e.g., PDSN 402) directly from the operator network. Therefore, when multiple different communication links (e.g., the cellular communication link 434, the WLAN communication link 436, and the LAN communication link 438) are used, the multiplexing of the different communication links may be performed between the device 410 and the FAP-I/arbitration interface layer 412 by the arbitration layer 415.

In one aspect, when the H-GW 408 receives PPP encapsulated IP packets from the PDSN 402 (i.e., OT packets) and PPP encapsulated IP packets from the local network 440 (i.e., LT packets), and the H-GW 408 determines that the cellular communication link 434 should be used to deliver the PPP encapsulated IP packets to the device 410, the H-GW 408 may use default femtocell operation as defined in 3GPP2 standards. For example, the H-GW 408 may set up a High Rate Packet Data (HRPD) session with the device 410 prior to a PPP session. The H-GW 408 may then use SN-PPP to transmit the PPP encapsulated IP packets received from the PDSN 402 via cellular communication link 434 and AN-PPP to transmit the PPP encapsulated IP packets received from the local network 440 via cellular communication link 434. In such aspect, the arbitration layer 415 may not attach a header that includes a MAC ID to the received PPP encapsulated IP packets.

In another aspect, when the H-GW 408 receives PPP encapsulated IP packets from the PDSN 402 (i.e., OT packets), an HRPD session is established and the PPP encapsulated IP packets from the PDSN 402 are encapsulated using a header attached by the arbitration layer 415 and tunneled between the FAP-I/arbitration interface layer 412 and the device 410.

The device 410 may receive the PPP encapsulated IP packets with the attached headers transmitted from the H-GW 408 and may remove the headers at the arbitration interface layer 430 to recover the PPP encapsulated IP packets. The PPP encapsulated IP packets may then be communicated to the PPP layer 432.

The device 410 may tunnel operator network routed traffic PPP encapsulated IP packets to the FAP-I/arbitration interface layer 415 via the WLAN interface 424 and/or the LAN interface 426. In one configuration, the device 410 may generate a PPP encapsulated IP packet that is to be transmitted to the PDSN 402. The arbitration layer 428 may determine a quality of each of the cellular communication link 434, the WLAN communication link 436, and the LAN communication link 438 in a manner similar to arbitration layer 415 as previously discussed. The arbitration layer 428 may then select the interface layer corresponding to the communication link having the highest quality, a quality higher than a threshold, or a quality that is closest to a quality requirement of the encapsulated IP packet generated by the device 410, such as the WLAN communication link 436. The arbitration layer 428 may then attach a header to one or more of the generated PPP encapsulated IP packets to tunnel the generated PPP encapsulated IP packets to the H-GW 408 via the selected communication interface layer. In one configuration, the header may include a MAC ID that corresponds to an optimal interface selected by the arbitration layer 428, such as the WLAN interface layer 424. The device 410 may then transmit one or more of the generated PPP encapsulated IP packets to the PDSN 402 via the H-GW 408.

Figure 5:
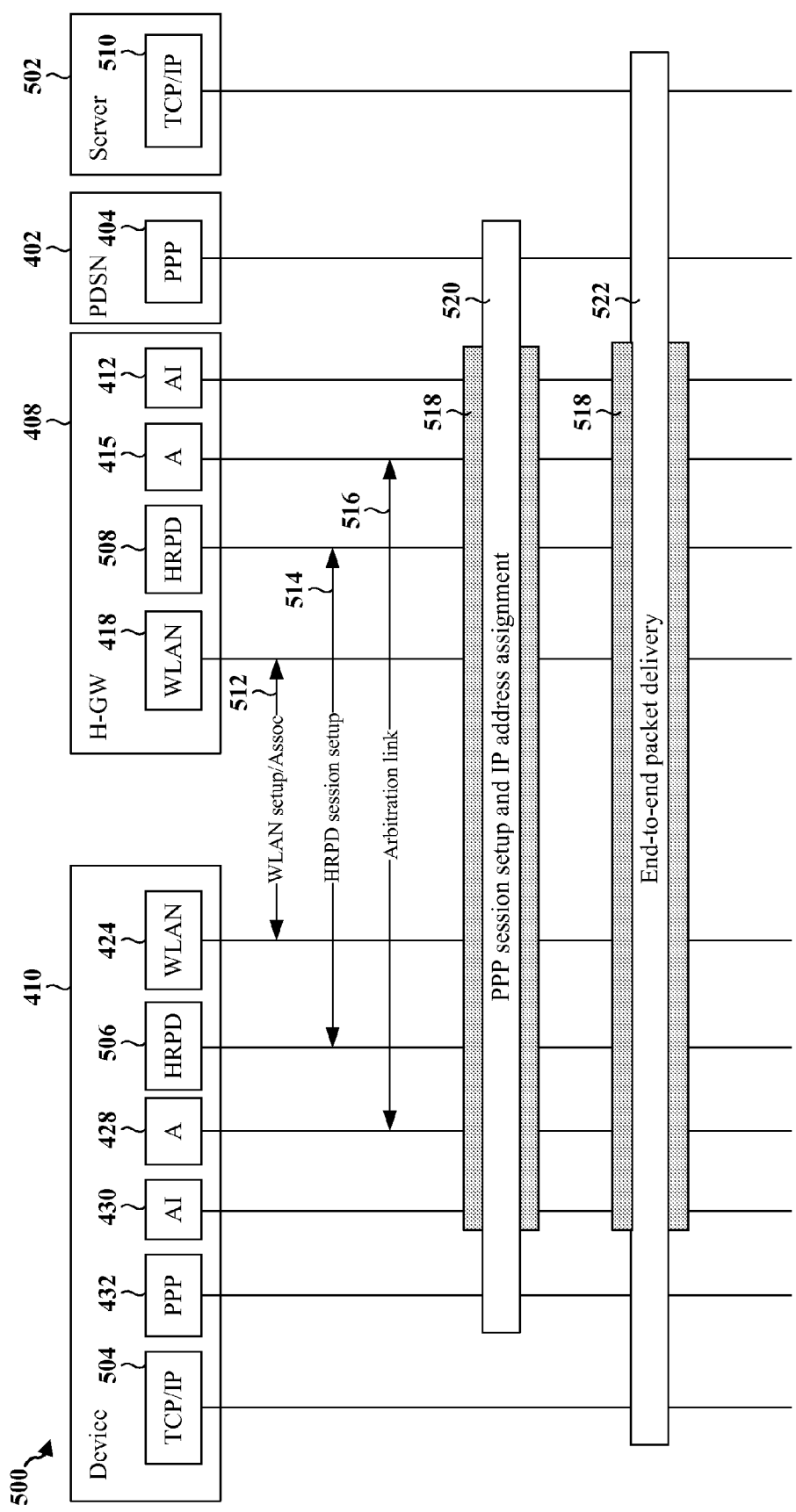
FIG. 5 is a diagram illustrating an end-to-end call flow.

FIG. 5 is a diagram illustrating an end-to-end call flow 500. The end-to-end call flow 500 includes server 502, PDSN 402, H-GW 408, and device 410. As shown in FIG. 5, device 410 includes Transmission Control Protocol (TCP)/IP layer 504, PPP layer 432, arbitration interface layer (also referred to as "AI") 430, arbitration layer (also referred to as "A") 428, HRPD interface layer 506, and WLAN interface layer 424.

The H-GW 408 includes WLAN interface layer 418, HRPD interface layer 508, arbitration layer (also referred to as "A") 415, and arbitration interface layer (also referred to as "AI") 412. PDSN 402 includes PPP layer 404, and server 502 includes TCP/IP layer 510. In an aspect, A 415 and AI 412 may each be a separate module configured to communicate using separate signaling between the device 410 and H-GW 408. In another aspect, the A 415 and AI 412 may be configured to communicate using signaling embedded within the signaling between the HRPD 508 and HRPD 506.

As shown in FIG. 5, device 410 may perform a WLAN setup/association 512 with the H-GW 408. The device 410 may further establish an HRPD session 514 and an arbitration link 516 with the H-GW 408. The PDSN 402 may then establish a PPP session 520 with the device 410 and assign an IP address to the device 410. In the configuration of FIG. 5, PPP encapsulated IP data packets may be communicated 522 between the TCP/IP 504 and the TCP/IP 510 of the server 502. For example, the server 502 may be an Internet server or a server of another public data network.

In an aspect, a PPP session 520 may be set up between the device 410 and PDSN 402 using WLAN interface 424 and the WLAN interface 418. In such aspect, the HRPD may not be required for setting up the PPP session 520. It should be understood that in other aspects, technologies other than HRPD, such as LTE, may be used.

As shown in FIG. 5, the PPP encapsulated IP data packets may be tunneled between device 410 and the H-GW 408 using the tunnel 518. In one configuration, the tunnel 518 is implemented at the arbitration interface layer 430 of the device 410 and the arbitration interface layer 412 of the H-GW 408. For example, the tunnel 518 may be implemented by attaching a header to one or more PPP encapsulated IP data packets and transmitted to the device 410. In one configuration, the header may include a MAC ID assigned to a particular communication link (e.g., a WLAN communication link), such that the one or more PPP encapsulated IP data packets are transmitted using the particular communication link. Upon receiving the one or more PPP encapsulated IP data packets, the device 410 may remove the attached header to recover the PPP encapsulated IP data packets.

Figure 6:
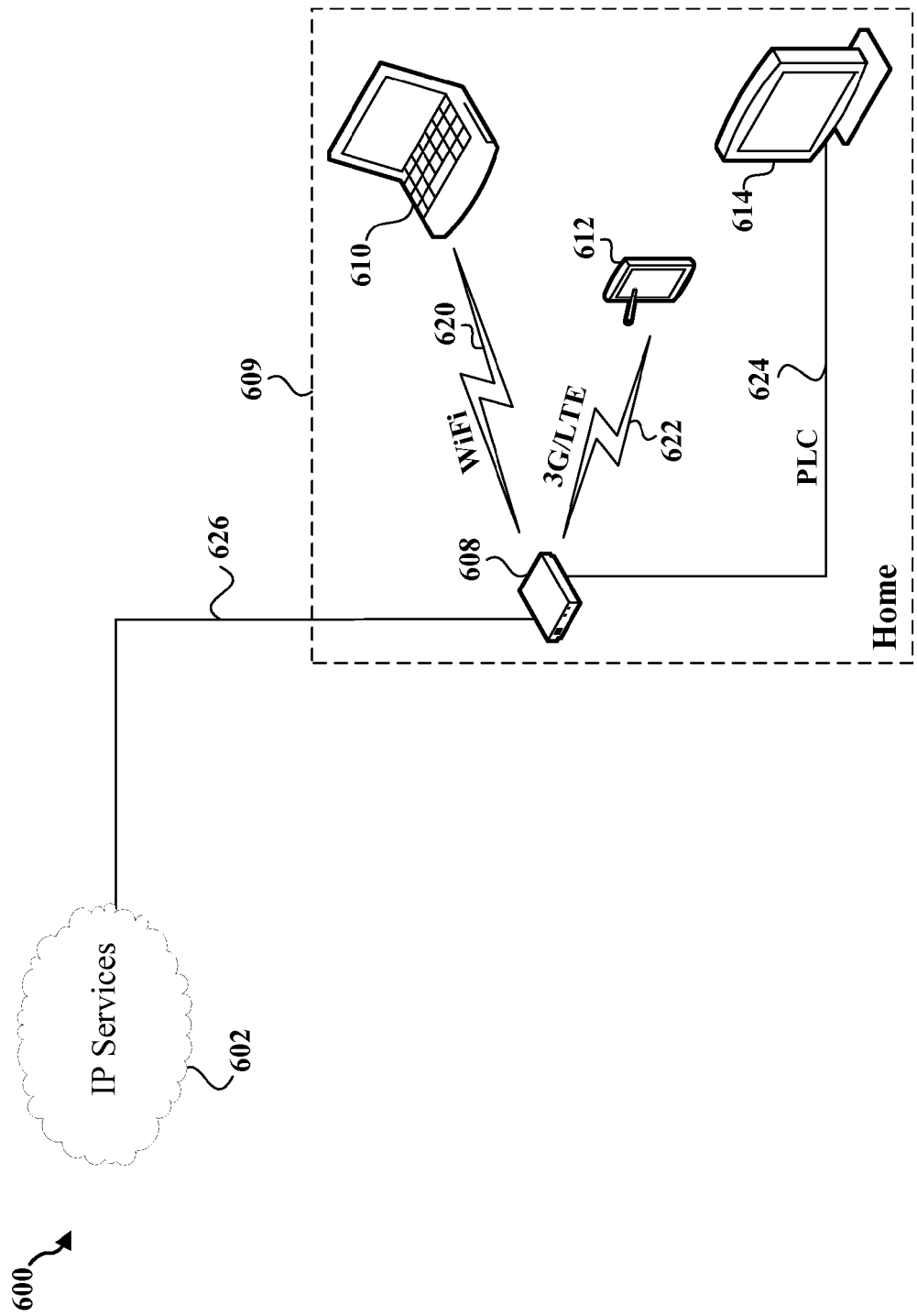
FIG. 6 is a diagram illustrating a communication system.

FIG. 6 is a diagram illustrating a communication system 600. The communication system 600 includes IP services 602, home AP 608, and devices 610, 612, and 614. The home AP 608 may be a multimode AP configured to communicate with one or more devices using various network communication technologies. In the configuration of FIG. 6, the home AP 608 may communicate with one or more devices using a LAN technology, such as a WLAN (e.g., WiFi™), MoCA™, PLC, and Ethernet. The home AP 608 may further communicate with one or more devices using a WAN technology (e.g., cellular communications), such as 3G or LTE, and may serve as a femtocell. As discussed infra, the home AP 608 may select one or more network communication technologies to communicate with the one or more devices.

In the configuration of FIG. 6, device 610 is in communication with the home AP 608 via the WiFi™ link 620, device 612 is in communication with the home AP 608 via the cellular link 622, and device 614 is in communication with the home AP 608 via the PLC link 624. In one aspect, device 610 is a personal computer, device 612 is a cellular telephone, and device 614 is a television. Devices 610, 612, and 614 may be located inside a home 609 and in proximity to the home AP 608.

In the configuration of FIG. 6, the backhaul may be a fixed backhaul that is provided to the home AP 608 via communication line 626. For example, the communication line 626 may be a digital subscriber line (DSL), cable, or fiber to the home (FTTH). The home AP 608 may be configured to determine an optimal communication link (e.g., WAN or WLAN/LAN) for communication with the devices 610, 612, and 614. In one configuration, the home AP 608 may implement a simplified WAN stack for local access to allow seamless selection of a communication link.

Figure 7:
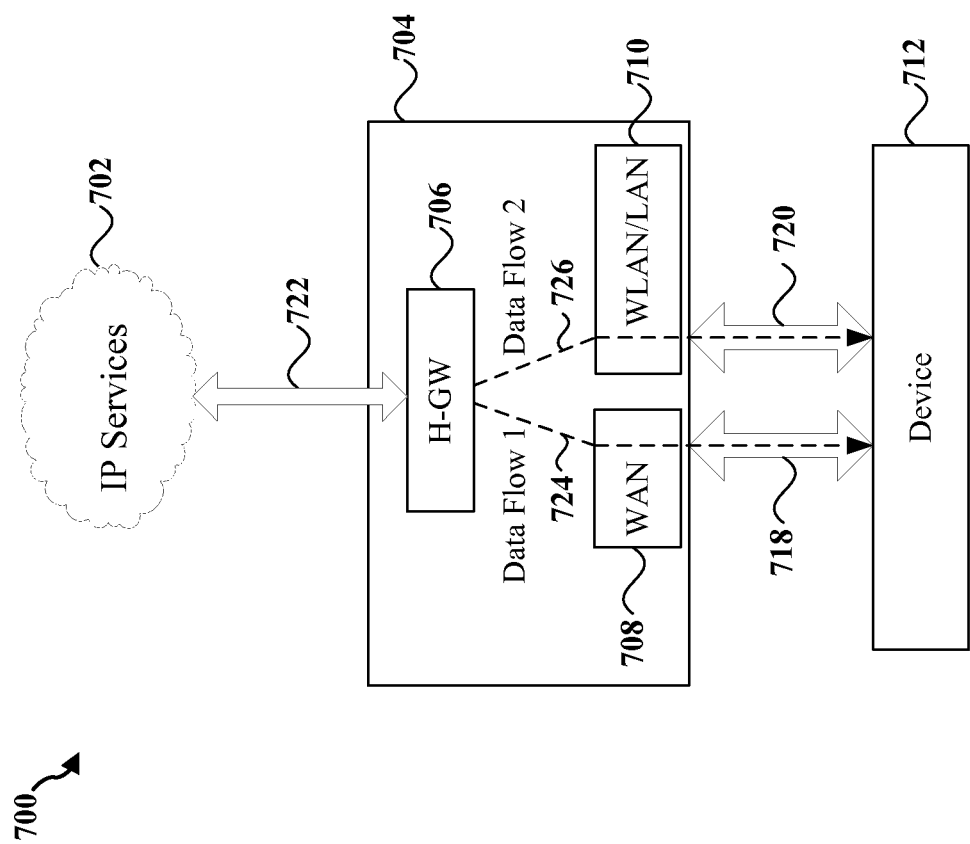
FIG. 7 is a diagram illustrating a communication system.

FIG. 7 is a diagram illustrating a communication system 700. The communication system 700 includes IP services 702, home AP 704, and device 712. For example, the device 712 may be a smartphone, a laptop computer, or any other suitable device. As shown in FIG. 7, the home AP 704 includes home gateway (H-GW) 706, WAN/FAP interface 708, and WLAN/LAN interface 710.

The H-GW 706 may receive two or more separate data flows over a logical link 722, such as data flow 1 724 and data flow 2 726, from the IP services 702. In one configuration, the data flow 1 724 and the data flow 2 726 may each include a stream of IP data packets from the Internet that are to be delivered to the device 712 at an assigned IP address. As shown in FIG. 7, the data flow 1 724 and the data flow 2 726 from the IP services 702 may be aggregated at the H-GW 706 and routed to the device 712 using a transmission technology determined by the H-GW 706. In one aspect, the transmission technology for transmitting a data flow may be selected by an arbitration layer of the H-GW 706 based on feedback indicating a quality of a communication link between an interface of the home AP 704 and the device 712. In the configuration of FIG. 7, data flow 1 724 is routed to the device 712 via the WAN/FAP interface 708 through cellular communication link 718. Data flow 2 726, however, is routed to the device 712 via the WLAN/LAN interface 710 over WLAN/LAN communication link 720.

In one aspect, the WAN/FAP interface 708 may be a radio communication interface based on cellular communication standards, such as EV-DO, CDMA2000 1×, LTE, or UMTS. The WLAN/LAN interface 710 may include one or more communication interfaces. For example, the WLAN/LAN interface 710 may include a communication interface based on IEEE 802.11 standards, such as WiFi™, a PLC interface, and/or a communication interface based on the MoCA™ standard.

Figure 8:
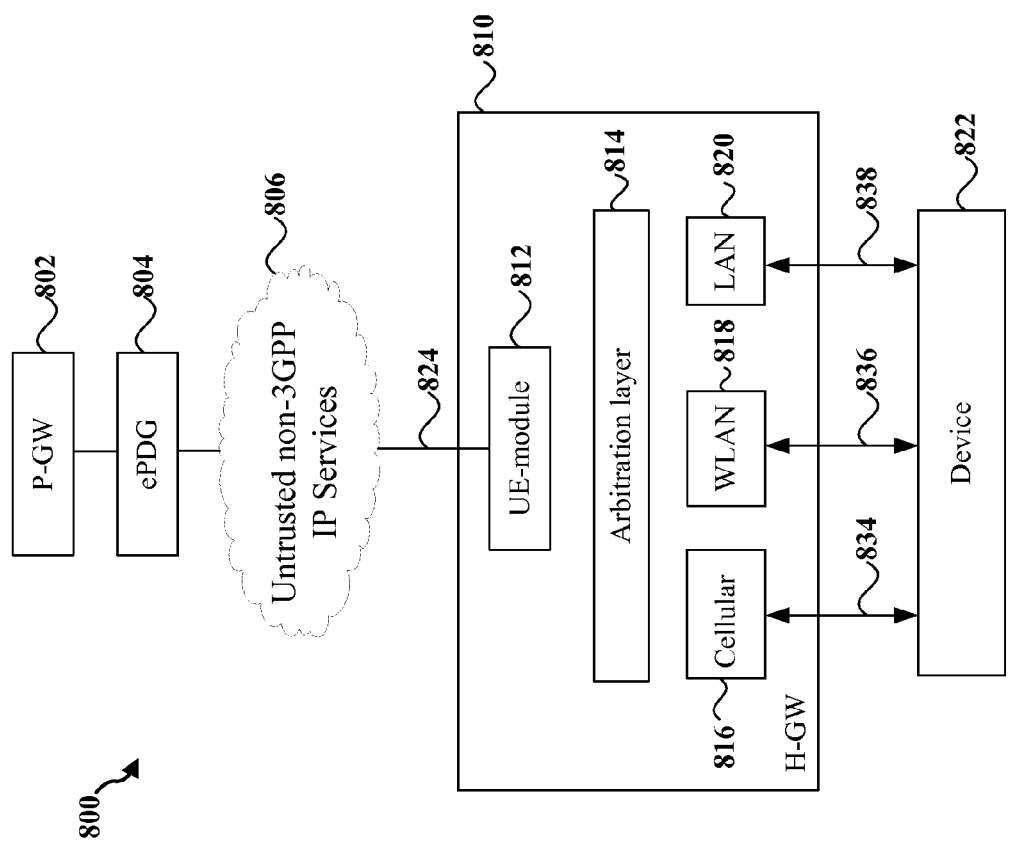
FIG. 8 is a diagram illustrating an architecture of a communication system.

FIG. 8 is a diagram illustrating an architecture of a communication system 800. Communication system 800 includes packet data network gateway (P-GW) 802, evolved packet data gateway (ePDG) 804, untrusted non-3GPP IP services 806, H-GW 810, and device 822. For example, the device 822 may be a smartphone, a laptop computer, or any other suitable device. As shown in FIG. 8, H-GW 810 includes a user equipment (UE)-module 812, arbitration layer 814, cellular interface layer 816, WLAN interface layer 818, and LAN interface layer 820.

The H-GW 810 may receive IP packets from the untrusted non-3GPP IP services 806 via communication link 824. The UE-module 812 is hosted by the H-GW 810 and obtains an IP address from the operator network (e.g., P-GW 802). The H-GW 810 is in communication with the device 822 via cellular communication link 834, WLAN communication link 836, and LAN communication link 838. The IP address of device 822 is assigned by the H-GW 810. For example, the H-GW 810 may use network address translation (NAT) or IPv6 interface ID to assign the IP address to the device 822. Although FIG. 8 shows a single device (i.e., device 822), it should be understood that additional devices may be in communication with the H-GW 810, such that the H-GW 810 assigns a different IP address to each of the additional devices. In the configuration of FIG. 8, the operator network (i.e., the P-GW 802) does not have control over the cellular interface layer 816. The cellular interface layer 816 terminates PPP and uses NULL authentication between the device 822 and the cellular interface layer 816.

The H-GW 810 may receive the IP packets from the untrusted non-3GPP IP services 806 via communication link 824, and the arbitration layer 814 may identify an optimal interface from among the cellular interface layer 816, the WLAN interface layer 818, and the LAN interface layer 820 for transmitting the IP packets to the device 822. Accordingly, the arbitration layer 814 arbitrates between different communication interface layers that may be used for transmission of IP packets.

In one configuration, the arbitration layer 814 may determine the optimal interface by determining a quality of each of the cellular communication link 834, the WLAN communication link 836, and the LAN communication link 838. The arbitration layer 814 may then select the interface layer corresponding to the communication link having the highest quality, a quality higher than a threshold, or a quality that is closest to a quality requirement of a received IP packet.

In one aspect, the arbitration layer 814 may attach a header to one or more IP packets of operator network routed traffic received from the P-GW 802. In one configuration, the header may include a first MAC ID that corresponds to an optimal interface layer selected by the arbitration layer 814, such as the WLAN interface layer 818. In such a configuration, the header allows mapping of the IP packets of operator network routed traffic to the data flow on the WLAN communication link 836.

In another configuration, the header may include a different MAC ID (e.g., a second MAC ID) that corresponds to a different optimal interface layer selected by the arbitration layer 814, such as the LAN interface layer 820. In such a configuration, the IP packets of operator network routed traffic may be mapped to the data flow on the LAN communication link 838.

In one aspect, if the arbitration layer 814 receives one or more IP packets from a local network (i.e., LT packets), the arbitration layer 814 may determine that the WLAN interface layer 818 is the optimal interface for transmitting the one or more IP packets from the local network. The arbitration layer 814 may then attach a third header to the one or more IP packets from the local network. In one configuration, the third header may include a third MAC ID that is different from the first MAC ID and that corresponds to an optimal interface layer selected by the arbitration layer 814, such as the WLAN interface layer 818. In another aspect, if the arbitration layer 814 determines that the LAN interface layer 820 is the optimal interface for transmitting the one or more IP packets from the local network, the arbitration layer 814 may attach a fourth header to the one or more IP packets from the local network. In one configuration, the fourth header may include a fourth MAC ID that is different from the second MAC ID and that corresponds to the optimal interface layer selected by the arbitration layer 814, such as the LAN interface layer 820.

Therefore, each communication interface layer (e.g., cellular interface layer 816, WLAN interface layer 818, and LAN interface layer 820) of the HG-W 810 may be assigned two different MAC IDs, such that one MAC ID is assigned to operator network routed traffic and another MAC ID is assigned to local network traffic.

In one aspect, if the arbitration layer 814 determines that the cellular interface layer 816 is the optimal interface for transmitting the one or more IP packets of the operator network routed traffic, the cellular interface layer 816 may use SN-PPP to transmit the one or more IP packets of the operator network routed traffic to the device 822. If the arbitration layer 814 determines that the cellular interface layer 816 is the optimal interface for transmitting the one or more IP packets of the local network traffic, the cellular interface layer 816 may use AN-PPP to transmit the one or more IP packets of the local network traffic to the device 822. Therefore, all IP packets of operator network routed traffic and local network traffic are integrated at the arbitration layer 814.

Figure 9:
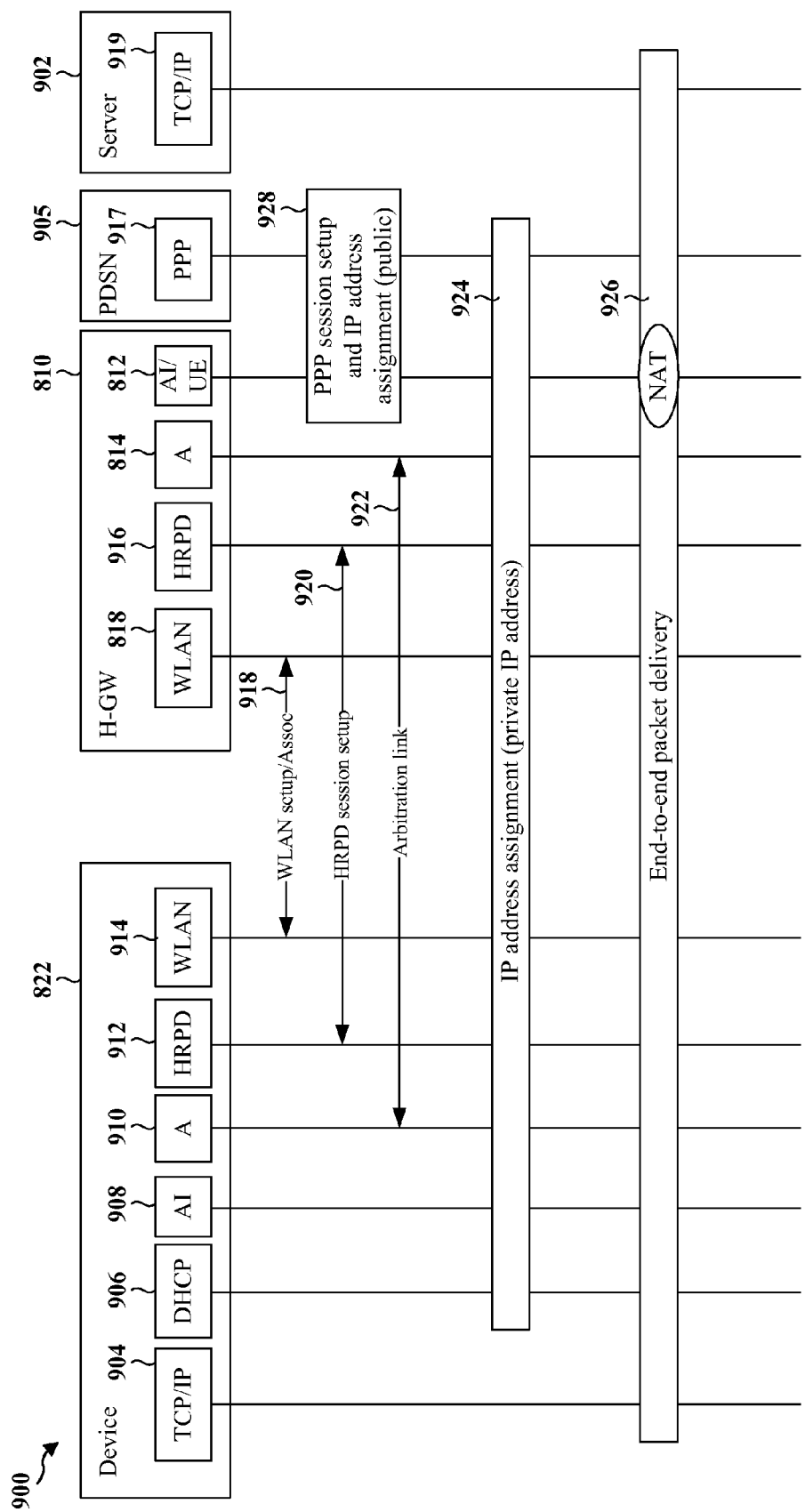
FIG. 9 is a diagram illustrating an end-to-end call flow.

FIG. 9 is a diagram illustrating an end-to-end call flow 900. The end-to-end call flow 900 includes server 902, PDSN 905, H-GW 810, and device 822. As shown in FIG. 9, device 822 includes TCP/IP layer 904, Dynamic Host Configuration Protocol (DHCP) layer 906, arbitration interface layer ("AI") 908, arbitration layer ("A") 910, HRPD interface layer 912, and WLAN interface layer 914. The H-GW 810 includes WLAN interface layer 818, HRPD interface layer 916, arbitration layer ("A") 814, and arbitration interface layer/UE module ("AI/UE") 812. PDSN 905 includes PPP layer 917, and server 902 includes TCP/IP layer 919. For example, the server 902 may be an Internet server or a server of another public data network.

As shown in FIG. 9, device 822 may perform a WLAN setup/association 918 with the H-GW 810. The device 822 may further establish an HRPD session 920, and an arbitration link 922 with the H-GW 810. The PDSN 905 may establish a PPP session 928 with the H-GW 810 and assign an IP address to the AI/UE 812. In the configuration of FIG. 9, DHCP is used for IP address assignment 924. IP packets are communicated directly (FE flow) over HRPD, such that PPP is not used over HRPD. In the configuration of FIG. 9, IP data packets may be communicated 922 between the TCP/IP 904 and the TCP/IP 919 of the server 902.

Figure 10:
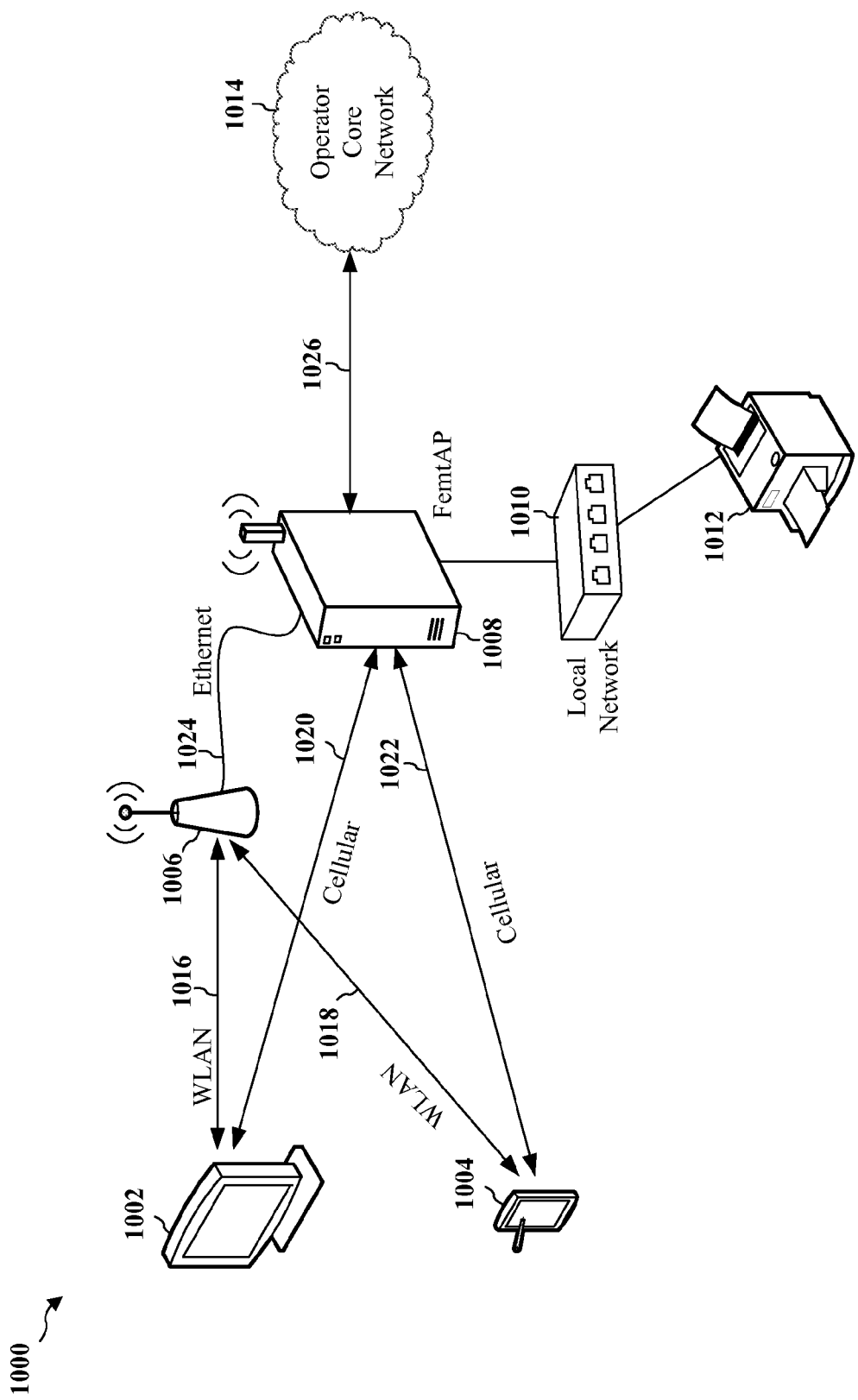
FIG. 10 is a diagram illustrating a communication system.

FIG. 10 is a diagram illustrating a communication system 1000. The communication system 1000 includes devices 1002 and 1004, wireless LAN AP 1006, home AP 1008, local network 1010, peripheral device 1012, and the operator core network 1014. In an aspect, the home AP 1008 may be a femto cell (also referred to as "FemtAP 1008") that optionally includes an access point (e.g., wireless LAN AP 1006).

The FemtAP 1008 may be a multimode AP configured to communicate with one or more devices using various network communication technologies. In the configuration of FIG. 10, the FemtAP 1008 may communicate with one or more devices using a local area network (LAN) technology, such as Ethernet. The FemtAP 1008 may further communicate with one or more devices using a wide area network (WAN) technology (e.g., cellular communications), such as 3G or Long Term Evolution (LTE), and may serve as a femtocell. Therefore, the FemtAP 1008 may select one or more network communication technologies to communicate with the one or more devices.

As shown in FIG. 10, devices 1002 and 1004 may communicate with the wireless LAN AP 1006 through respective wireless LAN communication links 1016 and 1018. For example, the device 1002 may be a digital television and the device 1004 may be a smartphone. As further shown in FIG. 10, devices 1002 and 1004 may communicate with the FemtAP 1008 through respective cellular communication links 1020 and 1022. The FemtAP 1008 may communicate with the operator core network via communication path 1026.

In one aspect, if the FemtAP 1008 is to send a data packet (e.g., an IP packet received from the operator core network 1014) to the device 1002, the FemtAP 1008 may determine the quality of the WLAN communication link 1016 and the quality of the cellular communication link 1020. If the quality of the WLAN communication link 1016 is closer to satisfying the transmission or service quality requirements of the data packet than the cellular communication link 1020, the FemtAP 1008 may attach a header to the data packet in order to tunnel the data packet to the device 1002 through the WLAN communication link 1016. In the configuration of FIG. 10, the FemtAP 1008 may send the data packet to the AP 1006 via the wired LAN connection (e.g., a wired Ethernet connection) 1024 for transmission of the data packet to the device 1002 through the WLAN communication link 1016. The AP 1006 may then transmit the data packet to the device 1002.

In another aspect, if the device 1002 is to send a data packet (e.g., an IP packet) to the operator core network 1014, the device 1002 may determine the quality of the WLAN communication link 1016 and the quality of the cellular communication link 1020. If the quality of the WLAN communication link 1016 is closer to satisfying the transmission or service quality requirements of the data packet than the cellular communication link 1020, the device 1002 may attach a header to the data packet in order to tunnel the data packet to the operator core network 1014 through the WLAN communication link 1016. In the configuration of FIG. 10, the device 1002 may send the data packet to the AP 1006 through the WLAN communication link 1016. The AP 1006 may then receive the data packet and send the data packet to the FemtAP 1008 through the wired LAN connection 1024. The FemtAP 1008 may then transmit the data packet to the operator core network 1014 through communication path 1026.

In another embodiment, all the uplink packets may be programmed to be transmitted over one air interface link (e.g., a cellular link) and all the downlink packets may be programmed to be transmitted over the other air interface link (e.g., a WLAN link). Therefore, interface management may be improved between the downlink and uplink packets on the WLAN link, where the same medium is shared both for uplink and downlink. In yet another embodiment, a signaling may be defined at the arbitration link to determine a particular air-interface radio that should be used for transmission of a particular IP flow.

Figure 11:
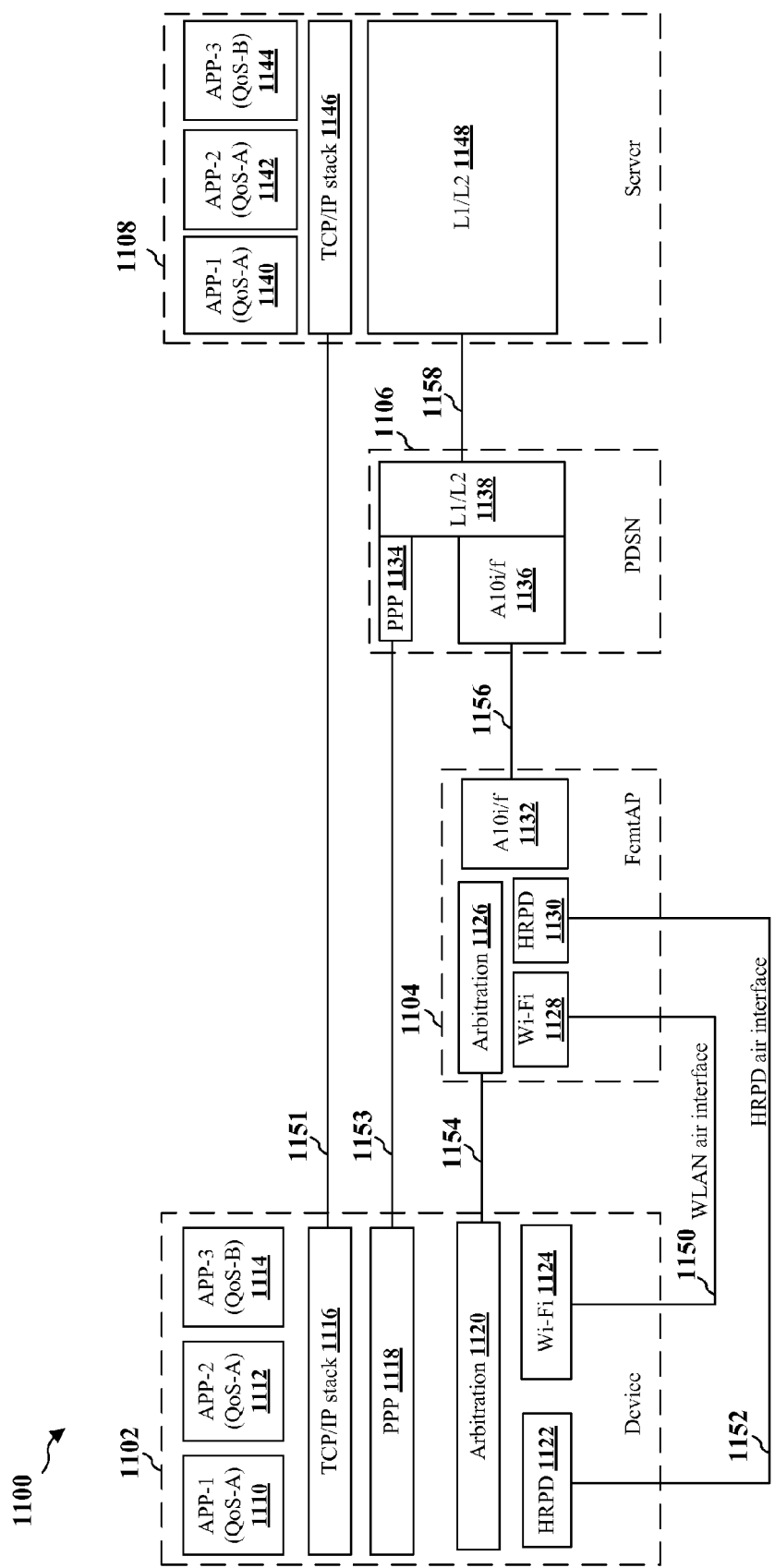
FIG. 11 is a protocol architecture that may be implemented by a communication system.

FIG. 11 is a protocol architecture 1100 that may be implemented by a communication system, such as communication system 100 in FIG. 1. Protocol architecture 1100 includes device 1102, femtAP 1104, PDSN 1106, and server 1108. For example, the device 1102 may be a digital television, a smartphone, or any other suitable device. Device 1102 includes application ("APP") modules APP-1 1110, APP-2 1112, and APP-3 1114. In the configuration of FIG. 11, APP-1 1110 and APP-2 1112 applies the same quality of service (e.g., "QoS-A") and APP-3 1114 applies a different quality of service (e.g., "QoS-B"). Device 1102 further includes TCP/IP stack 1116, PPP interface 1118, arbitration layer 1120, HRPD interface 1122, and WiFi™ interface 1124. The femtAP 1104 includes arbitration layer 1126, WiFi™ interface 1128, HRPD interface 1130, and A10 interface 1132. The PDSN 1106 includes PPP interface 1134, A10 interface 1136, L1/L2 air interface 1138. Server 1108 includes application modules APP-1 1140, APP-2 1142, and APP-3 1144. In the configuration of FIG. 11, APP-1 1140 and APP-2 1142 apply the same quality of service (e.g., "QoS-A") and APP-3 1144 applies a different quality of service (e.g., "QoS-B"). Server 1108 further includes TCP/IP stack 1146, and L1/L2 air interface 1148.

In FIG. 11, TCP/IP stack 1116 establishes a session 1151 with TCP/IP stack 1146, PPP interface 1118 establishes a PPP session 1153 with PPP interface 1134, arbitration layer 1120 establishes a link 1154 with arbitration layer 1126, A10 interface 1132 establishes a link 1156 with A10 interface 1136, and L1/L2 air interface 1138 establishes a link 1158 with L1/L2 air interface 1148. As shown in FIG. 11, the PPP session 1153 is setup between PDSN 1106 and the device 1102 directly. The PPP session 1153 may be transparent to whether PPP messages are carried over HRPD or WLAN. An IP address may be assigned by the operator network (PDSN/ HA/LMA).

Multiplexing is performed at the link flow, where each link flow has a unique QoS requirement. This can be viewed as a virtual "extension of A10." For example, in an HRPD air interface, A10s are mapped to radio link protocols (RLPs). As another example, for a non-HRPD air-interface, A10s are mapped to WLAN/PLC. One or more A10s may be mapped to a radio link based on the QoS requirements. For example, APP-1 1110 & APP-2 1112 (having same QoS) may use the HRPD air interface 1152 and APP-3 1114 may use WiFi™ air interface 1150.

A signaling mechanism 1154 by the Arbitration Layer (1120 & 1126) will be used to determine which packets are transmitted over which link. The packet may be identified using a "packet identifier" in the header defined at the Arbitration layer, where the identifier identifies the IP flow associated with it. The IP flow is determined using 5-tuple format which includes Source IP address, Destination IP address, Source Port, Destination Port and Protocol Number. This will allow a packet level multiplexing between multiple radio technologies.

Figure 12:
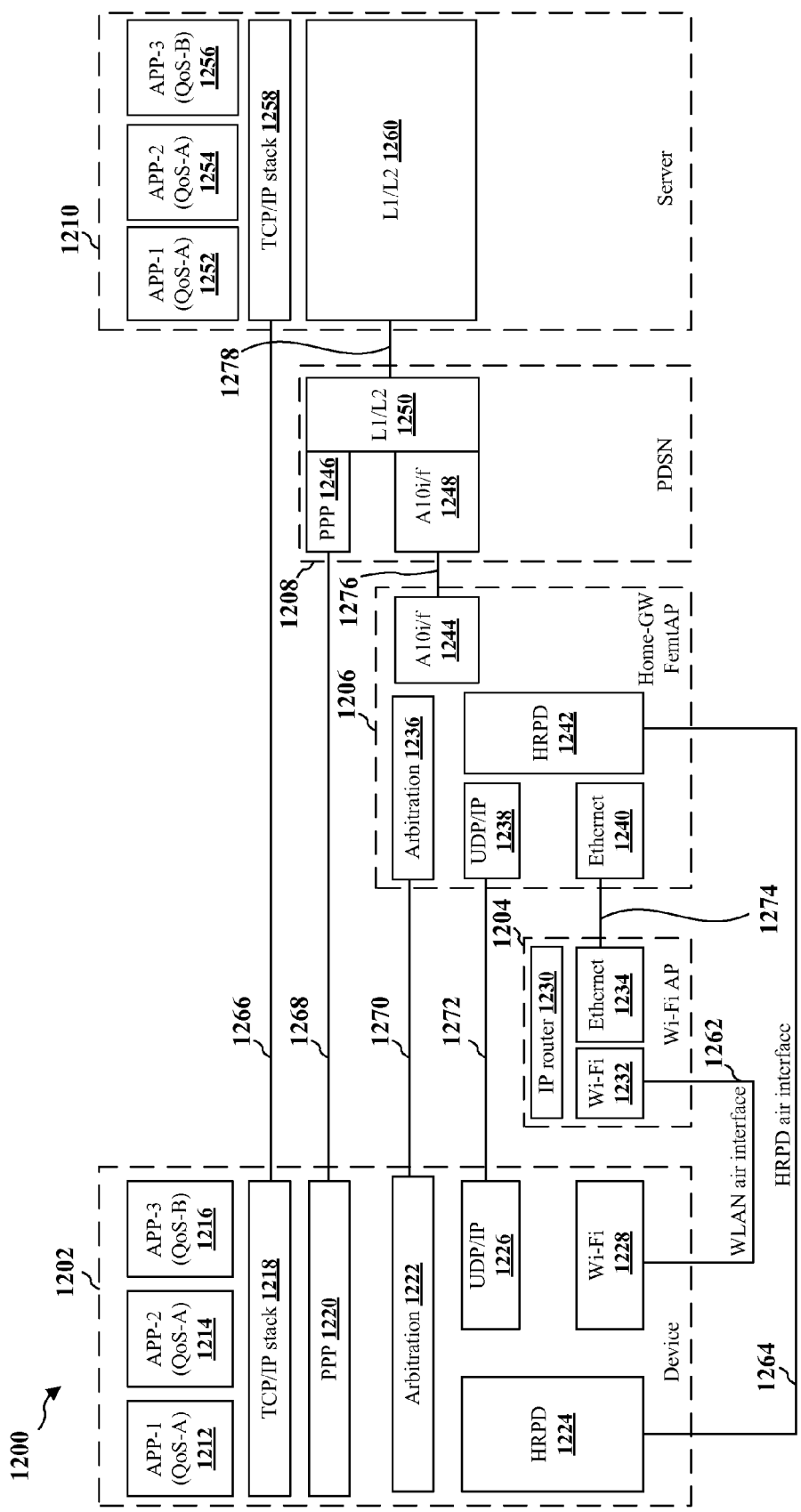
FIG. 12 is a protocol architecture that may be implemented by a communication system.

FIG. 12 is a protocol architecture 1200 that may be implemented by a communication system, such as communication system 1000 in FIG. 10. Protocol architecture 1200 includes device 1202, WiFi™ access point 1204, home gateway 1206, PDSN 1208, and server 1210. For example, the device 1202 may be a digital television, a smartphone, or any other suitable device. Device 1202 includes application ("APP") modules APP-1 1212, APP-2 1214, and APP-3 1216. In the configuration of FIG. 12, APP-1 1212 and APP-2 1214 apply the same quality of service (e.g., "QoS-A") and APP-3 1216 applies a different quality of service (e.g., "QoS-B"). Device 1202 further includes TCP/IP stack 1218, PPP interface 1220, arbitration layer 1222, HRPD interface 1224, user datagram protocol (UDP)/IP interface 1226, and WiFi™ interface 1228. The WiFi™ access point 1204 includes IP router 1230, WiFi™ interface 1232, and Ethernet interface 1234. The home gateway 1206 includes arbitration layer 1236, UDP/IP interface 1238, Ethernet interface 1240, HRPD interface 1242, and A10 interface 1244. The PDSN 1208 includes PPP interface 1246, A10 interface 1248, L1/L2 air interface 1250. Server 1210 includes application modules APP-1 1252, APP-2 1254, and APP-3 1256. In the configuration of FIG. 12, APP-1 1252 and APP-2 1254 apply the same quality of service (e.g., "QoS-A") and APP-3 1256 applies a different quality of service (e.g., "QoS-B"). Server 1210 further includes TCP/IP stack 1258, and L1/L2 air interface 1260.

In FIG. 12, TCP/IP stack 1218 establishes a session 1266 with TCP/IP stack 1258, PPP interface 1220 establishes a PPP session 1268 with PPP interface 1246, arbitration layer 1222 establishes a link 1270 with arbitration layer 1236, UDP/IP interface 1226 establishes a link 1272 with UDP/IP interface 1238, A10 interface 1244 establishes a link 1276 with A10 interface 1248, and L1/L2 air interface 1250 establishes a link 1278 with L1/L2 air interface 1260. The HRPD 1224 and the HRPD 1242 communicate via the HRPD air interface 1264.

In an aspect, arbitration layer 1222 uses UDP/IP interface 1226 to use WiFi™ interface 1228. End-to-end arbitration signaling (e.g, radio measurements, flow switching etc.) is performed over UDP/IP link 1272. For example, a special UDP port may be defined for arbitration layer signaling. As shown in FIG. 12, WiFi™ AP 1204 is coupled to the home gateway 1206, which may be viewed as an external router with respect to the WiFi™ AP 1204. However, home gateway 1206 may need to add the ability to provide DHCP proxy function in order to handle requests initiated by WiFi™ AP 1204.

With reference to FIG. 11, the FemtAP 1104 includes internal WiFi™ communication capability through internal WiFi™ interface 1128. In FIG. 12, however, the home gateway 1206 communicates with the device 1202 via the external WiFi™ AP 1204. For example, home gateway 1206 may communicate with the WiFi™ AP 1204 via Ethernet connection 1274, and the WiFi™ AP 1204 may communicate with the device 1202 over the WLAN air interface 1262.

It should be understood that the protocol architecture 1200 is not limited to the HRPD stack shown in FIG. 12. In other embodiments, the protocol architecture 1200 may be applied to a different protocol stack, such as an LTE protocol stack.

Figure 13A:
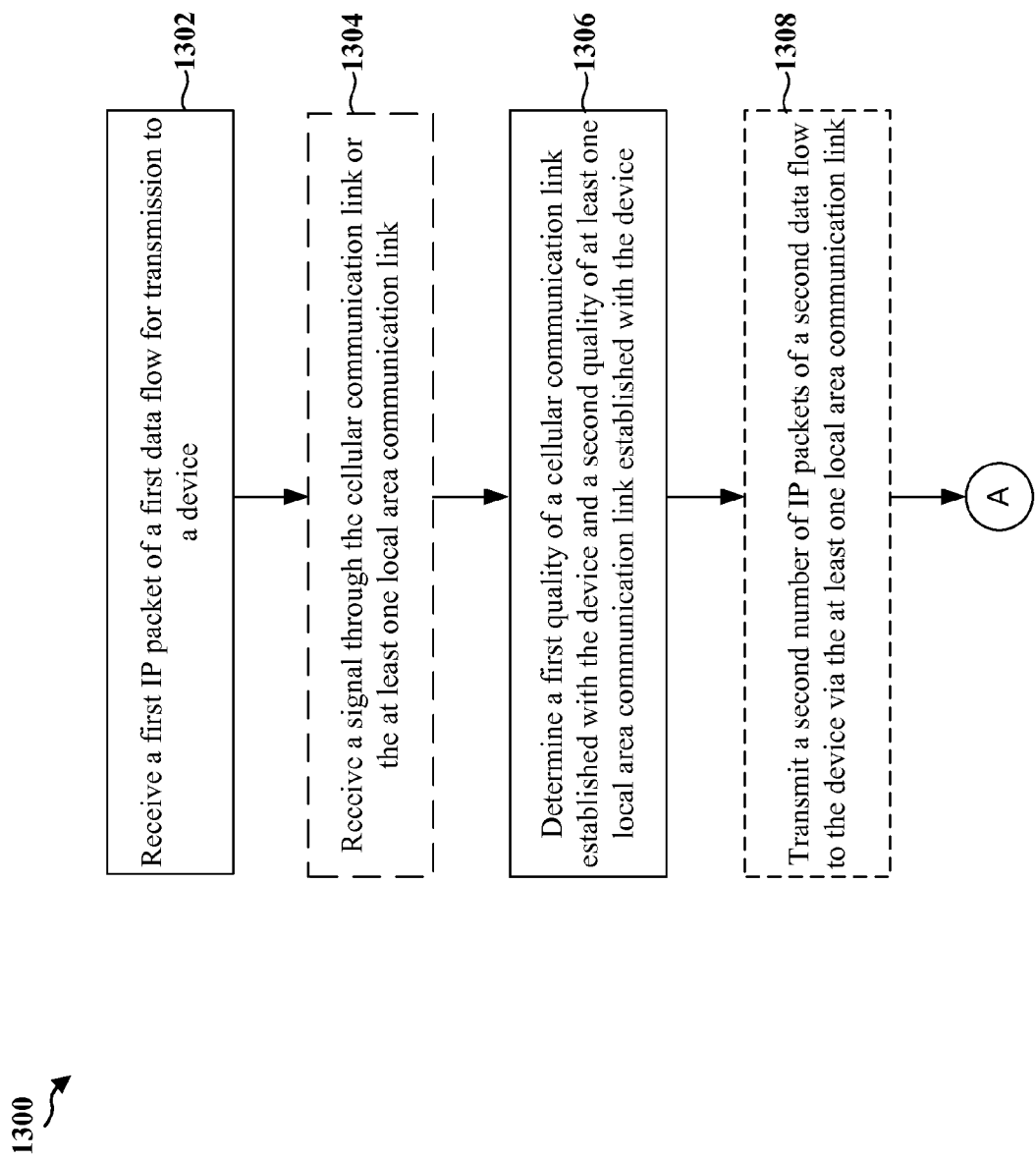
FIGS. 13A and 13B are a flow chart of a method of wireless communication.
Figure 13B:
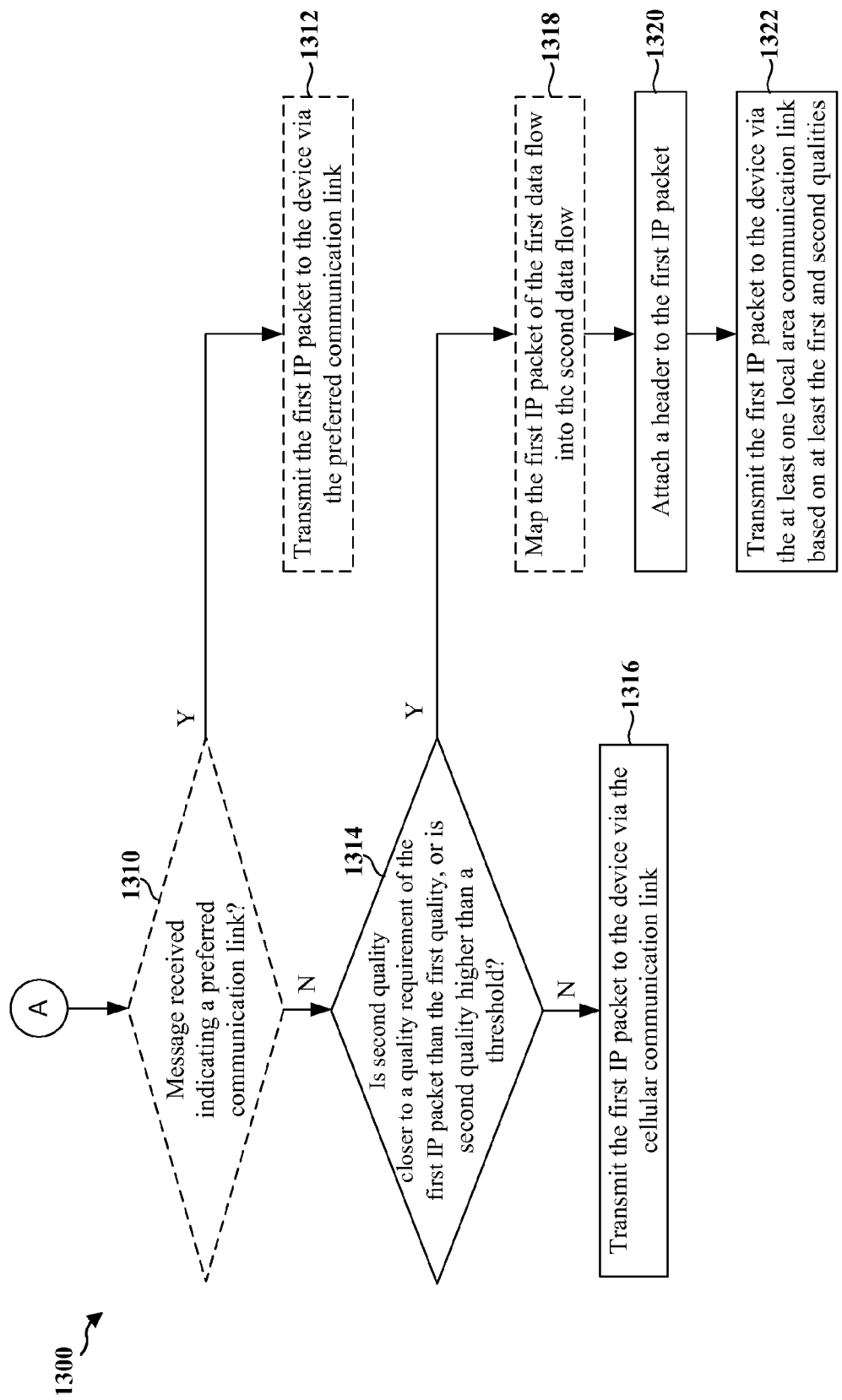

FIGS. 13A and 13B are a flow chart 1300 of a method of communication. The method may be performed by an H-GW (also referred to as an "intermediate gateway"). At step 1302, the intermediate gateway (e.g., H-GW 408 in FIG. 4) receives, from a gateway of a cellular network (e.g., PDSN 402 in FIG. 4), a first IP packet of a first data flow for transmission to a device (e.g., device 410 in FIG. 4). In one configuration, the first IP packet may be one of a first plurality of IP packets of the first data flow transmitted from the gateway of the cellular network via a logical link. The first plurality of IP packets may be configured by the gateway of the cellular network for transmission to the device over a cellular communication link (e.g., cellular communication link 434 in FIG. 4) established with the device.

At step 1304, the intermediate gateway may receive a signal through the cellular communication link established with the device or at least one local area communication link established with the device. For example, the at least one local area communication link may be a LAN or WLAN communication link. For example, the at least one local area communication link may include WiFi™, PLC, MoCA™, and/or Ethernet. In an aspect, the signal may include one or more quality measurements of the cellular communication link and/or the at least one local area communication link.

At step 1306, the intermediate gateway may determine a first quality of the cellular communication link established with the device and a second quality of at least one local area communication link established with the device. In an aspect, the intermediate gateway may use the one or more quality measurements in the signal to determine the first and/or second qualities.

At step 1308, the intermediate gateway may transmit a second number of IP packets of a second data flow to the device via the at least one local area communication link (e.g., the WLAN communication link 436 in FIG. 4). The second number of IP packets of the second data flow may be transmitted to an IP address assigned to the device.

At step 1310, with reference to FIG. 13B, the intermediate gateway may determine whether a message is received from the gateway of the cellular network indicating a preferred communication link established with the device. If the message is received (1310), the intermediate gateway may transmit the first IP packet to the device via the preferred communication link at step 1312.

If the message is not received, then at step 1314, the intermediate gateway may determine whether the second quality of at least one local area communication link established with the device is closer to a quality requirement of the first IP packet than the first quality of the cellular communication link established with the device. In one aspect, the intermediate gateway may acquire data by performing measurements on the at least one local area communication link and the cellular communication link, and may implement an algorithm using the data to determine whether the second quality is closer to a quality requirement of the first IP packet than the first quality. In another configuration, the intermediate gateway may determine whether the second quality of the at least one local area communication link is higher than a threshold. If the second quality is not closer to a quality requirement of the first IP packet than the first quality, and if the second quality is not higher than a threshold, then at step 1316, the intermediate gateway may transmit the first IP packet to the device via the cellular communication link.

If the second quality is closer to a quality requirement of the first IP packet than the first quality or if the second quality is higher than a threshold, then at step 1318, the intermediate gateway may map the first IP packet of the first data flow into the second data flow. At step 1320, the intermediate gateway may then attach a header to the first IP packet. In one configuration, the header may include a first MAC ID that corresponds to the optimal communication link having the second quality, such as the WLAN communication link 436 in FIG. 4. Therefore, the header may be used to map the first IP packet into the data flow on the WLAN communication link 436. Accordingly, the header may be used to tunnel the first IP packet to the device via the at least one local area communication link.

Finally, at step 1322, the intermediate gateway may transmit the first IP packet to the device via the at least one local area communication link based on at least the first and second qualities. In one aspect, as described infra with reference to FIG. 10, the intermediate gateway (e.g., intermediate gateway 1008 in FIG. 10) may transmit the first IP packet to an external WLAN access point (e.g., wireless LAN AP 1006 in FIG. 10) through a wired local area network connection (e.g., Ethernet 1024), and the external WLAN access point may deliver the first IP packet to the device through a wireless LAN communication link (e.g., wireless LAN communication link 1016 or 1018).

Figure 14:
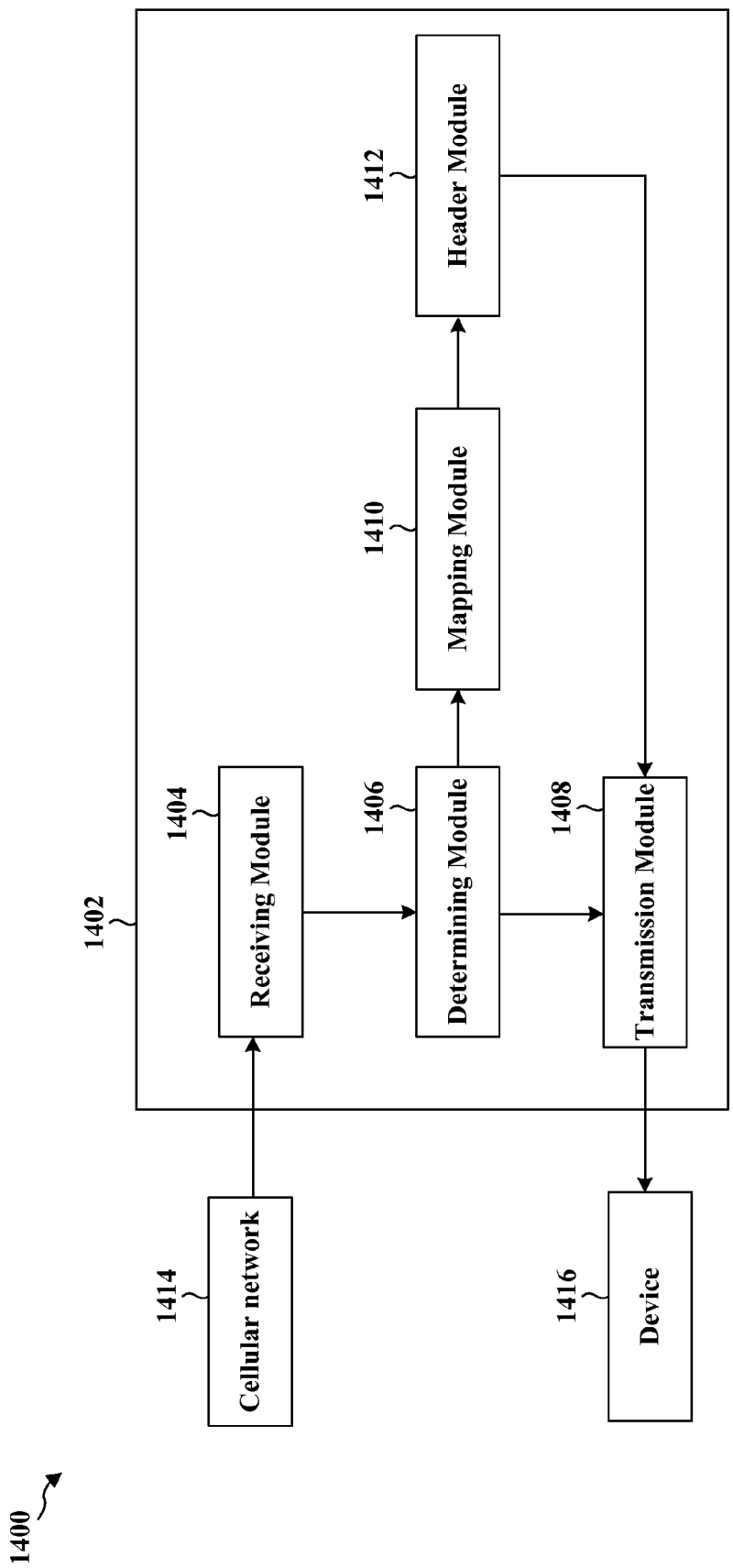
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be an H-GW (also referred to as an "intermediate gateway"). The apparatus includes a receiving module 1404 that receives, from a gateway of a cellular network, a first IP packet of a first data flow transmitted to a device. In an aspect, the receiving module 1404 may receive a signal through the cellular communication link established with the device or at least one local area communication link established with the device. In an aspect, the signal may include one or more quality measurements of the cellular communication link and/or the at least one local area communication link.

The apparatus further includes a determining module 1406 that determines a first quality of the cellular communication link established with the device and a second quality of at least one local area communication link established with the device. The determining module 1406 further determines whether the second quality of at least one local area communication link established with the device is closer to a quality requirement of the first IP packet than the first quality of the cellular communication link established with the device. The determining module 1406 may further determine whether the second quality of the at least one local area communication link is higher than a threshold. The determining module 1406 may further determine whether a message is received from the gateway of the cellular network indicating a preferred communication link established with the device.

The apparatus further includes a mapping module 1410 that maps the first IP packet of the first data flow into the second data flow, and a header module 1412 that attaches a header to the first IP packet according to the mapping. The attached header may be used to tunnel the first IP packet to the device via the at least one local area communication link.

The apparatus further includes a transmission module 1408 that transmits the first IP packet to the device via the at least one local area communication link when the second quality is closer to a quality requirement of the first IP packet than the first quality or when the second quality is higher than a threshold. In one configuration, the intermediate gateway may transmit the first IP packet to an access point through a wired local area network connection, and the access point may deliver the first IP packet to the device through a wireless local area network connection. The transmission module 1408 may further transmit the first IP packet to the device via the cellular communication link.

The apparatus may include additional modules that perform each of the steps of the algorithm in the aforementioned flow chart of FIGS. 13A and 13B. As such, each step in the aforementioned flow chart of FIGS. 13A and 13B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
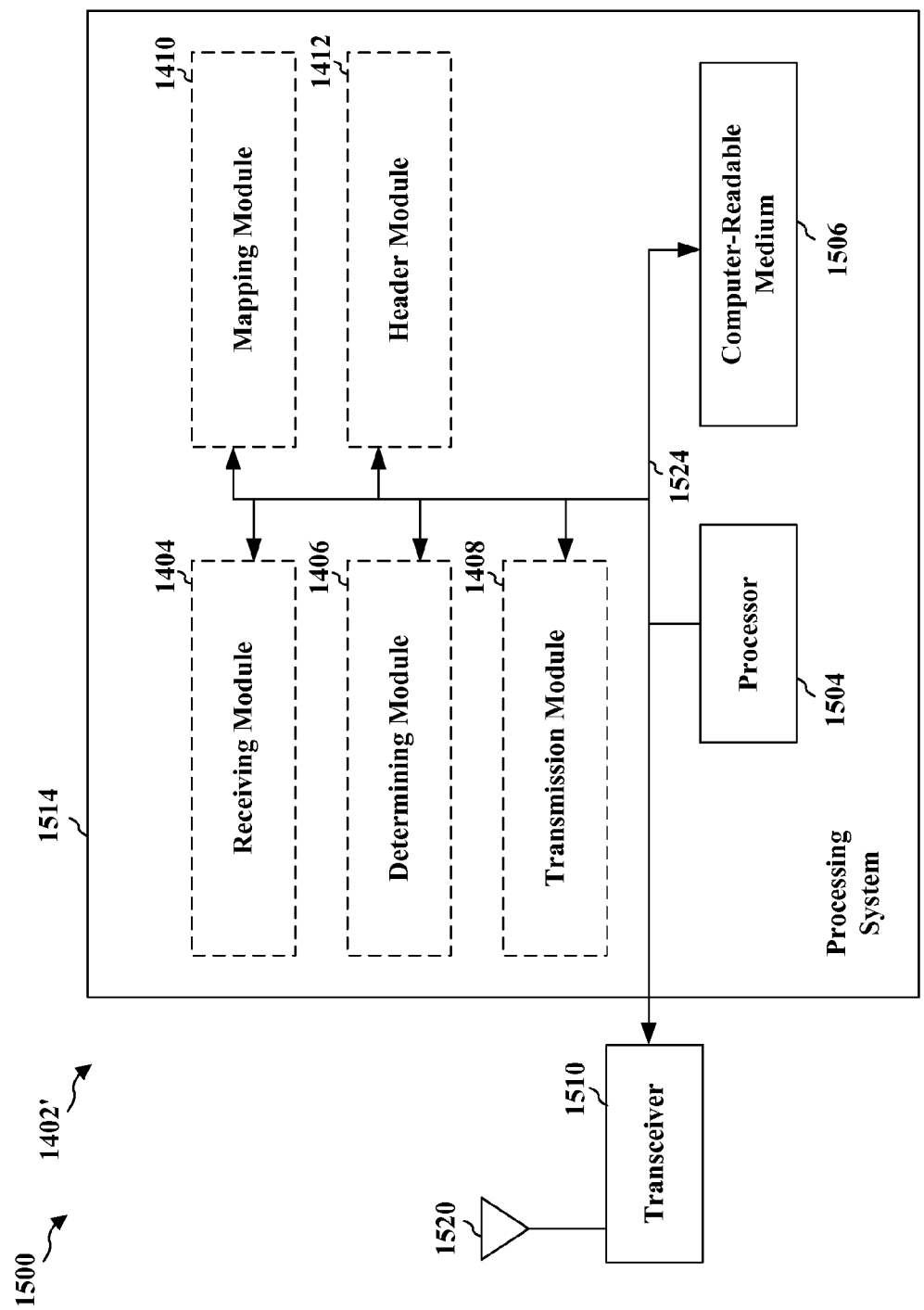
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, and 1412, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, 1408, 1410, and 1412. The modules may be software modules running in the processor 1504, resident/stored in the computer readable medium 1506, one or more hardware modules coupled to the processor 1504, or some combination thereof.

In one configuration, the apparatus 1402/1402' for wireless communication includes means for receiving, from a gateway of a cellular network, a first IP packet of a first data flow transmitted to a device, means for determining a first quality of a cellular communication link established with the device and a second quality of at least one local area communication link established with the device, means for transmitting the first IP packet to the device via the at least one local area communication link based on whether the second quality is higher than the first quality, means for attaching a header to the first IP packet, the header being used to tunnel the first IP packet to the device via the at least one local area communication link, means for transmitting the first IP packet to the device via the at least one local area communication link when the second quality is higher than a threshold, means for receiving a message from the gateway of the cellular network indicating a preferred communication link established with the device, means for transmitting a second plurality of packets of a second data flow to the device via the at least one local area communication link, and means for mapping the first IP packet of the first data flow into the second data flow. The aforementioned means may be one or more of the aforementioned modules of the apparatus 1402 and/or the processing system 1514 of the apparatus 1402' configured to perform the functions recited by the aforementioned means.

Figure 16:
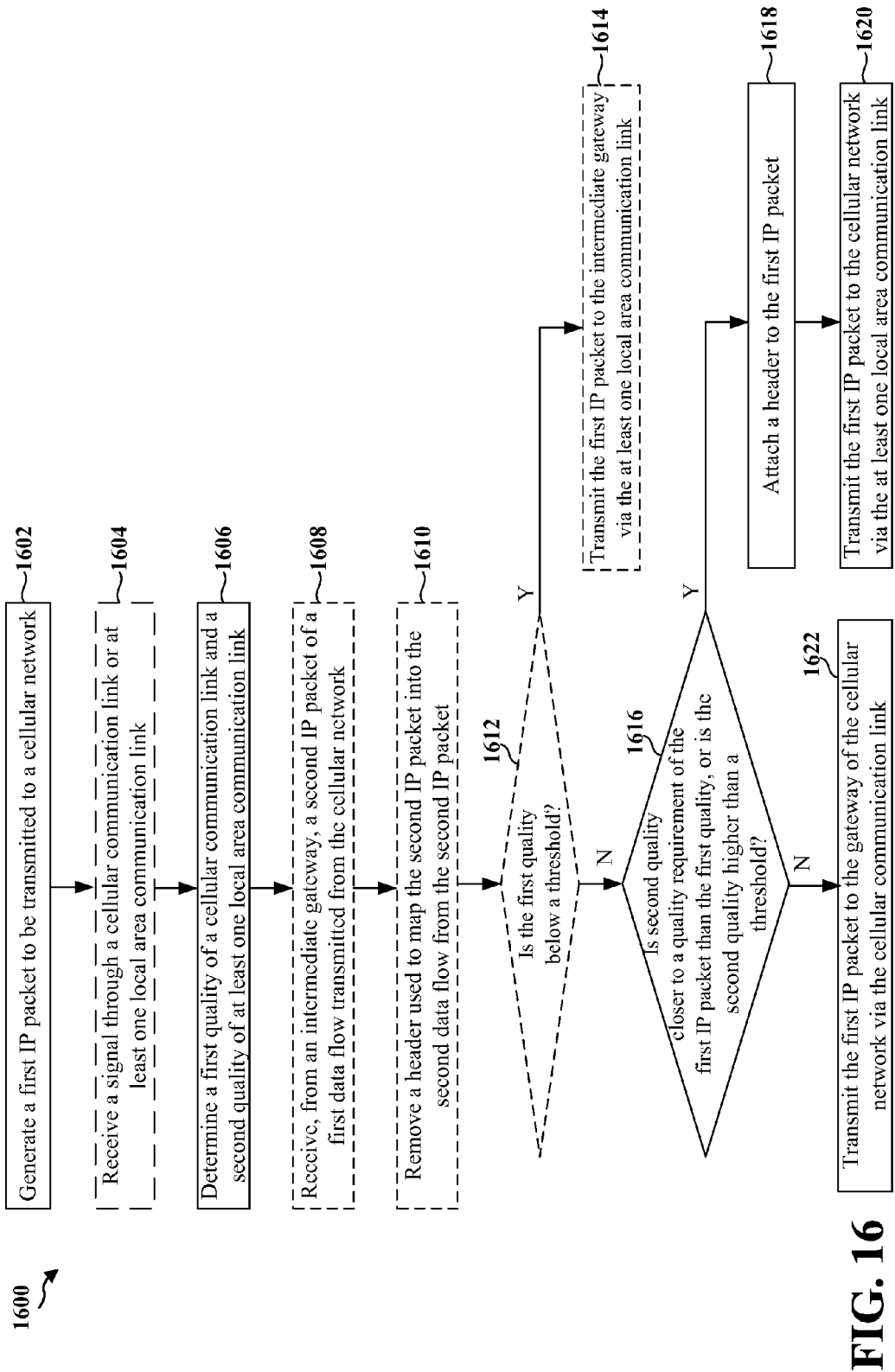
FIG. 16 is a flow chart of a method of wireless communication.

FIG. 16 is a flow chart 1600 of a method of communication. The method may be performed by a device (e.g., device 410 in FIG. 4). At step 1602, the device may generate a first IP packet to be transmitted to a gateway of a cellular network (e.g., PDSN 402 in FIG. 4), where the gateway of the cellular network is in communication with an intermediate gateway (e.g., H-GW 408 in FIG. 4).

At step 1604, the device may receive a signal through a cellular communication link (e.g., cellular communication link 434 in FIG. 4) established with the device or at least one local area communication link (e.g., WLAN communication link 436 and/or LAN communication link 438 in FIG. 4) established with the device. For example, the at least one local area communication link may include WiFi™, PLC, MoCA™, and/or Ethernet. In an aspect, the signal may include one or more quality measurements of the cellular communication link and/or the at least one local area communication link.

At step 1606, the device may determine a first quality of the cellular communication link (e.g., cellular communication link 434 in FIG. 4) established with the intermediate gateway (e.g., H-GW 408 in FIG. 4) and a second quality of the at least one local area communication link (e.g., WLAN communication link 436 in FIG. 4) established with the intermediate gateway. In an aspect, the device may use the one or more quality measurements in the signal to determine the first and/or second qualities.

At step 1608, the device may receive, from the intermediate gateway, a second IP packet of a first data flow transmitted from the gateway of the cellular network, the second IP packet being mapped into a second data flow that is received via the at least one local area communication link. At step 1610, the device may remove a header from the second IP packet, the header having been attached by the intermediate gateway and used to map the second IP packet into the second data flow.

At step 1612, the device may determine whether the first quality is below a threshold. If the first quality is below the threshold (1612), the device may transmit the first IP packet to the intermediate gateway via the at least one local area communication link at step 1614.

Otherwise, at step 1616, the device may determine whether the second quality of at least one local area communication link established with the device is closer to a quality requirement of the first IP packet than the first quality of the cellular communication link established with the device. In another configuration, the device may determine whether the second quality of the at least one local area communication link is higher than a threshold. If the second quality is not closer to a quality requirement of the first IP packet than the first quality and if the second quality is not higher than a threshold, then at step 1622, the device may transmit the first IP packet to the gateway of the cellular network via the cellular communication link.

If the second quality is closer to a quality requirement of the first IP packet than the first quality or if the second quality is higher than a threshold, then at step 1618, the device may attach a header to the first IP packet. In one configuration, the header may include a MAC ID that corresponds to an optimal communication link, such as the WLAN communication link 436 in FIG. 4. Therefore, the header may be used to tunnel the first IP packet to the gateway of the cellular network via the at least one local area communication link.

Finally, at step 1620, the device may transmit the first IP packet to the gateway of the cellular network via the at least one local area communication link. In one aspect, as described infra with reference to FIG. 16, the device may transmit the first IP packet to an access point through a wireless LAN connection, and the access point may then deliver the first IP packet to the cellular network at least through a wired local area network connection.

Figure 17:
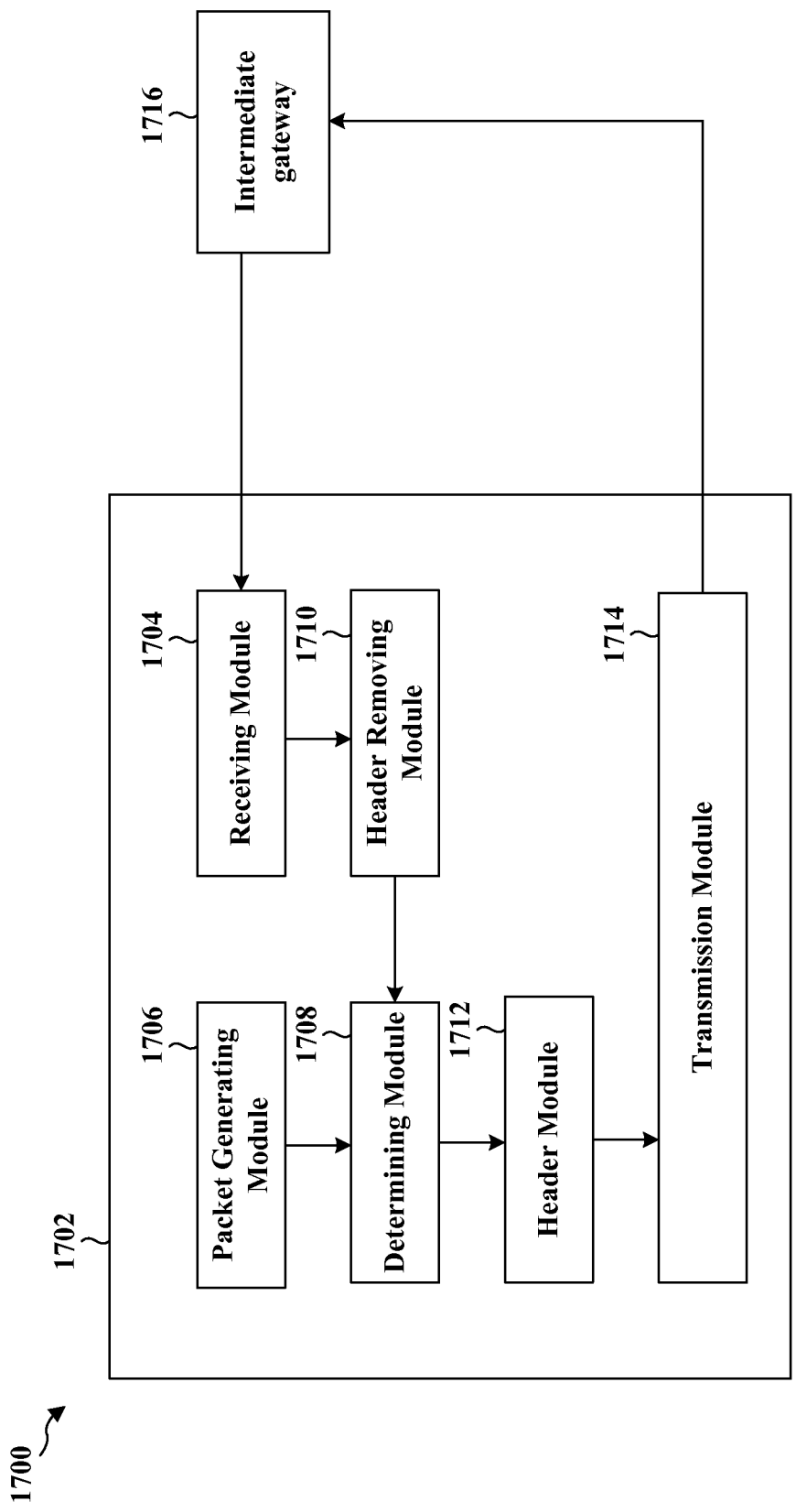
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be a device, such as device 412 in FIG. 4. The apparatus includes a receiving module 1704 that receives, from the intermediate gateway, a second IP packet of a first data flow transmitted from the gateway of the cellular network, the second IP packet being mapped into a second data flow that is received via the at least one local area communication link. The receiving module 1704 may receive a signal through a cellular communication link established with the device or at least one local area communication link established with the device. In an aspect, the signal may include one or more quality measurements of the cellular communication link and/or the at least one local area communication link.

The apparatus further includes a header removing module 1710 that removes a header from the second IP packet, the header being used to map the second IP packet into the second data flow.

The apparatus further includes a packet generating module 1706 that generates a first IP packet for transmission to a gateway of a cellular network, the gateway of the cellular network in communication with an intermediate gateway. The apparatus further includes a determining module 1708 that determines a first quality of a cellular communication link established with the intermediate gateway and a second quality of at least one local area communication link established with the intermediate gateway. The determining module 1708 further determines whether the second quality of at least one local area communication link established with the device is closer to a quality requirement of the first IP packet than the first quality of the cellular communication link established with the device. The determining module 1708 further determines whether the first quality is below a threshold.

The apparatus further includes a header module 1712 that attaches a header to the first IP packet, the header being used to tunnel the first IP packet to the intermediate gateway via the at least one local area communication link.

The apparatus further includes a transmission module 1714 that transmits the first IP packet to the gateway of the cellular network via the at least one local area communication link. In one configuration, the transmission module 1714 may transmit the first IP packet to an access point through a wireless local area network connection, and the access point may then deliver the first IP packet to the cellular network at least through a wired local area network connection. The transmission module 1108 may further transmit the first IP packet to the gateway of the cellular network via the cellular communication link.

The apparatus may include additional modules that perform each of the steps of the algorithm in the aforementioned flow chart of FIG. 16. As such, each step in the aforementioned flow chart of FIG. 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
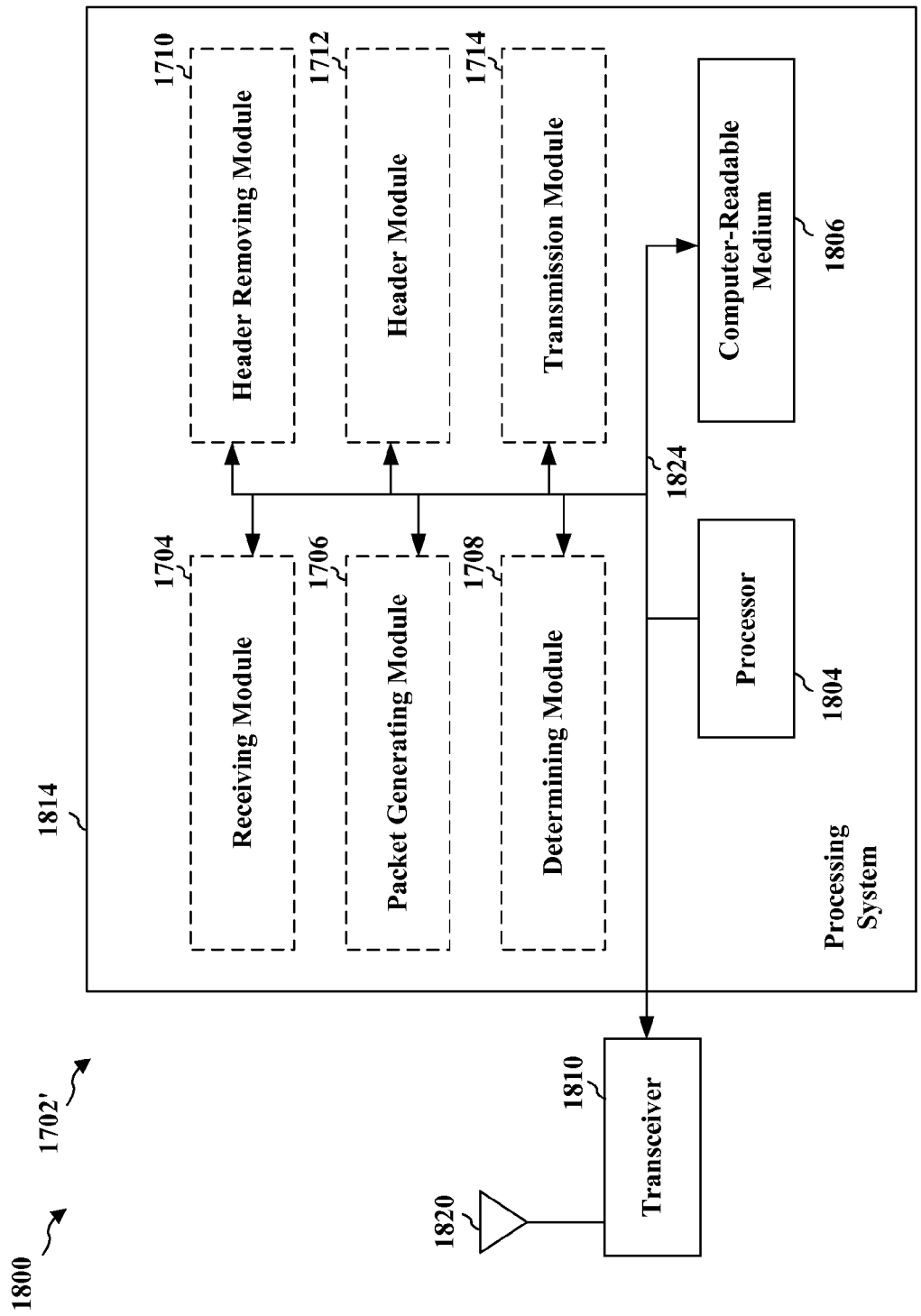
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, 1710, 1712, and 1714, and the computer-readable medium 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The processing system 1814 includes a processor 1804 coupled to a computer-readable medium 1806. The processor 1804 is responsible for general processing, including the execution of software stored on the computer-readable medium 1806. The software, when executed by the processor 1804, causes the processing system 1814 to perform the various functions described supra for any particular apparatus. The computer-readable medium 1806 may also be used for storing data that is manipulated by the processor 1804 when executing software. The processing system further includes at least one of the modules 1704, 1706, 1708, 1710, 1712, and 1714. The modules may be software modules running in the processor 1804, resident/stored in the computer readable medium 1806, one or more hardware modules coupled to the processor 1804, or some combination thereof.

In one configuration, the apparatus 1702/1702' for communication includes means for generating a first IP packet to be transmitted to a gateway of a cellular network, the gateway of the cellular network in communication with an intermediate gateway, means for determining a first quality of a cellular communication link established with the intermediate gateway and a second quality of at least one local area communication link established with the intermediate gateway, means for transmitting the first IP packet to the gateway of the cellular network via the at least one local area communication link based on whether the second quality is higher than the first quality, means for receiving, from the intermediate gateway, a second IP packet of a first data flow transmitted from the gateway of the cellular network, the second IP packet being mapped into a second data flow being received via the at least one local area communication link, means for removing a header from the second IP packet, the header being used to map the second IP packet into the second data, and means for transmitting the first IP packet to the intermediate gateway via the at least one local area communication link when the second quality is higher than a threshold. The aforementioned means may be one or more of the aforementioned modules of the apparatus 1702 and/or the processing system 1814 of the apparatus 1702' configured to perform the functions recited by the aforementioned means.

Therefore, the configurations described herein may increase the usage of cellular communication technology within home networks to provide reliable home networking service through a licensed spectrum. Moreover, the configurations described herein may provide mobile operators additional control in home networks, thereby resulting in higher revenues.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communication comprising:
   receiving a first point-to-point protocol (PPP) encapsulated Internet protocol (IP) packet of a first data flow for transmission to a device;
   establishing a tunnel that receives the first PPP encapsulated IP packet and that tunnels the first PPP encapsulated packet to a PPP layer of the device, the tunnel employing a cellular communication link established with the device and at least one local area communication link established with the device;
   determining a first quality of the cellular communication link and a second quality of the at least one local area communication link;
   attaching a header to the first PPP encapsulated IP packet when the second quality is closer to a quality requirement of the first PPP encapsulated IP packet than the first quality, wherein the cellular communication link is accessible through a first interface and the at least one local area communication link is accessible through a second interface, wherein the header includes an identifier corresponding to the second interface, and wherein the header is used to tunnel the first PPP encapsulated IP packet to the device via the at least one local area communication link; and transmitting the first PPP encapsulated IP packet to the device through the tunnel and via the second interface and the at least one local area communication link in accordance with the identifier in the header based on at least the first and second qualities.

2. The method of claim 1, further comprising attaching the header to the first PPP encapsulated IP packet when the second quality is higher than a threshold.

3. The method of claim 2, further comprising transmitting the first PPP encapsulated IP packet to the device via the at least one local area communication link when the second quality is higher than the threshold.

4. The method of claim 1, further comprising determining whether a message is received, the message indicating a preferred communication link established with the device,
wherein the transmitting the first PPP encapsulated IP packet to the device via the at least one local area communication link is further based on the preferred communication link.

5. The method of claim 1, wherein the first PPP encapsulated IP packet is one of a first plurality of PPP encapsulated IP packets of the first data flow transmitted from a cellular network via a logical link, the first plurality of PPP encapsulated IP packets being configured by the cellular network for transmission to the device over the cellular communication link.

6. The method of claim 5, further comprising:
transmitting a second plurality of PPP encapsulated IP packets of a second data flow to the device via the at least one local area communication link; and
mapping the first PPP encapsulated IP packet of the first data flow into the second data flow.

7. The method of claim 6, wherein the mapping comprises attaching the header to the first PPP encapsulated IP packet.

8. The method of claim 1, further comprising receiving a signal through the cellular communication link or the at least one local area communication link, the signal comprising one or more quality measurements of at least the cellular communication link or the at least one local area communication link.

9. The method of claim 1, wherein transmitting the first PPP encapsulated IP packet to the device comprises transmitting the first PPP encapsulated IP packet to an access point through a wired local area network connection, the access point configured to deliver the first PPP encapsulated IP packet to the device through a wireless local area network connection.

10. A method of communication comprising:
generating a first point-to-point protocol (PPP) encapsulated Internet protocol (IP) packet to be transmitted to a cellular network, the cellular network in communication with an intermediate gateway;
establishing a tunnel that receives the first PPP encapsulated IP packet and that tunnels the first PPP encapsulated packet to a PPP layer of the intermediate gateway, the tunnel employing a cellular communication link established with the intermediate gateway and at least one local area communication link established with the intermediate gateway;
determining a first quality of the cellular communication link and a second quality of the at least one local area communication link;

attaching a first header to the first PPP encapsulated IP packet when the second quality is closer to a quality requirement of the first PPP encapsulated IP packet than the first quality, wherein the cellular communication link is accessible through a first interface and the at least one local area communication link is accessible through a second interface, wherein the first header includes an identifier corresponding to the second interface, and wherein the first header is used to tunnel the first PPP encapsulated IP packet to the cellular network via the at least one local area communication link; and transmitting the first PPP encapsulated IP packet to the intermediate gateway through the tunnel and via the second interface and the at least one local area communication link in accordance with the identifier in the first header based on at least the first and second qualities.

11. The method of claim 10, further comprising attaching the first header to the first PPP encapsulated IP packet when the second quality is higher than a threshold.

12. The method of claim 10, further comprising receiving, from the intermediate gateway, a second PPP encapsulated IP packet of a first data flow transmitted from the cellular network, the second PPP encapsulated IP packet being mapped into a second data flow that is received via the at least one local area communication link.

13. The method of claim 12, further comprising removing a second header from the second PPP encapsulated IP packet, the second header being used to map the second PPP encapsulated IP packet into the second data flow.

14. The method of claim 10, further comprising transmitting the first PPP encapsulated IP packet to the intermediate gateway via the at least one local area communication link when the first quality is below a threshold.

15. The method of claim 10, further comprising receiving a signal through the cellular communication link or the at least one local area communication link, the signal comprising one or more quality measurements of at least the cellular communication link or the at least one local area communication link.

16. The method of claim 10, wherein transmitting the first PPP encapsulated IP packet to the cellular network via the at least one local area communication link comprises transmitting the first PPP encapsulated IP packet to an access point through a wireless local area network connection, the access point configured to deliver the first PPP encapsulated IP packet to the cellular network at least through a wired local area network connection.

17. An apparatus for communication, comprising:
means for receiving a first point-to-point protocol (PPP) encapsulated Internet protocol (IP) packet of a first data flow for transmission to a device;
means for stablishing a tunnel that receives the first PPP encapsulated IP packet and that tunnels the first PPP encapsulated packet to a PPP layer of the device, the tunnel employing a cellular communication link established with the device and at least one local area communication link established with the device;
means for determining a first quality of the cellular communication link and a second quality of the at least one local area communication link;
means for attaching a header to the first PPP encapsulated IP packet when the second quality is closer to a quality requirement of the first PPP encapsulated IP packet than the first quality, wherein the cellular communication link is accessible through a first interface and the at least one local area communication link is accessible through a second interface, wherein the header includes an identifier corresponding to the second interface, and wherein the header is used to tunnel the first PPP encapsulated IP packet to the device via the at least one local area communication link; and means for transmitting the first PPP encapsulated IP packet to the device through the tunnel and via the second interface and the at least one local area communication link in accordance with the identifier in the header based on at least the first and second qualities.

18. The apparatus of claim 17, further comprising means for attaching the header to the first PPP encapsulated IP packet when the second quality is higher than a threshold.

19. The apparatus of claim 18, further comprising means for transmitting the first PPP encapsulated IP packet to the device via the at least one local area communication link when the second quality is higher than the threshold.

20. The apparatus of claim 17, further comprising means for determining whether a message is received, the message indicating a preferred communication link established with the device, wherein the transmitting the first PPP encapsulated IP packet to the device via the at least one local area communication link is further based on the preferred communication link.

21. The apparatus of claim 17, wherein the first PPP encapsulated IP packet is one of a first plurality of PPP encapsulated IP packets of the first data flow transmitted from a cellular network via a logical link, the first plurality of PPP encapsulated IP packets being configured by the cellular network for transmission to the device over the cellular communication link.

22. The apparatus of claim 21, further comprising:
means for transmitting a second plurality of PPP encapsulated IP packets of a second data flow to the device via the at least one local area communication link; and
means for mapping the first PPP encapsulated IP packet of the first data flow into the second data flow.

23. The apparatus of claim 22, wherein the mapping comprises attaching the header to the first PPP encapsulated IP packet.

24. The apparatus of claim 17, further comprising means for receiving a signal through the cellular communication link or the at least one local area communication link, the signal comprising one or more quality measurements of at least the cellular communication link or the at least one local area communication link.

25. The apparatus of claim 17, wherein transmitting the first PPP encapsulated IP packet to the device comprises transmitting the first PPP encapsulated IP packet to an access point through a wired local area network connection, the access point configured to deliver the first PPP encapsulated IP packet to the device through a wireless local area network connection.

26. An apparatus of communication comprising:
means for generating a first point-to-point protocol (PPP) encapsulated Internet protocol (IP) packet to be transmitted to a cellular network, the cellular network in communication with an intermediate gateway;
means for establishing a tunnel that receives the first PPP encapsulated IP packet and that tunnels the first PPP encapsulated packet to a PPP layer of the intermediate gateway, the tunnel employing a cellular communication link established with the intermediate gateway and at least one local area communication link established with the intermediate gateway;
means for determining a first quality of the cellular communication link and a second quality of the at least one local area communication link;
means for attaching a first header to the first PPP encapsulated IP packet when the second quality is closer to a quality requirement of the first PPP encapsulated IP packet than the first quality, wherein the cellular communication link is accessible through a first interface and the at least one local area communication link is accessible through a second interface, wherein the first header includes an identifier corresponding to the second interface, and wherein the first header is used to tunnel the first PPP encapsulated IP packet to the cellular network via the at least one local area communication link; and means for transmitting the first PPP encapsulated IP packet to the intermediate gateway through the tunnel and via the second interface and the at least one local area communication link in accordance with the identifier in the first header based on at least the first and second qualities.

27. The apparatus of claim 26, further comprising means for attaching the first header to the first PPP encapsulated IP packet when the second quality is higher than a threshold.

28. The apparatus of claim 26, further comprising means for receiving, from the intermediate gateway, a second PPP encapsulated IP packet of a first data flow transmitted from the cellular network, the second PPP encapsulated IP packet being mapped into a second data flow that is received via the at least one local area communication link.

29. The apparatus of claim 28, further comprising means for removing a second header from the second PPP encapsulated IP packet, the second header being used to map the second PPP encapsulated IP packet into the second data flow.

30. The apparatus of claim 26, further comprising means for transmitting the first PPP encapsulated IP packet to the intermediate gateway via the at least one local area communication link when the first quality is below a threshold.

31. The apparatus of claim 26, further comprising means for receiving a signal through the cellular communication link or the at least one local area communication link, the signal comprising one or more quality measurements of at least the cellular communication link or the at least one local area communication link.

32. The apparatus of claim 26, wherein transmitting the first PPP encapsulated IP packet to the cellular network via the at least one local area communication link comprises transmitting the first PPP encapsulated IP packet to an access point through a wireless local area network connection, the access point configured to deliver the first PPP encapsulated IP packet to the cellular network at least through a wired local area network connection.

33. An apparatus for communication, comprising:
a memory; and
at least one processor coupled to the memory and configured to:
receive a first point-to-point protocol (PPP) encapsulated Internet protocol (IP) packet of a first data flow for transmission to a device;
establish a tunnel that receives the first PPP encapsulated IP packet and that tunnels the first PPP encapsulated packet to a PPP layer of the device, the tunnel employing a cellular communication link established with the device and at least one local area communication link established with the device;
determine a first quality of the cellular communication link and a second quality of the at least one local area communication link;
attach a header to the first PPP encapsulated IP packet when the second quality is closer to a quality requirement of the first PPP encapsulated IP packet than the first quality, wherein the cellular communication link is accessible through a first interface and the at least one local area communication link is accessible through a second interface, wherein the header includes an identifier corresponding to the second interface, and wherein the header is used to tunnel the first PPP encapsulated IP packet to the device via the at least one local area communication link; and transmit the first PPP encapsulated IP packet to the device through the tunnel and via the second interface and the at least one local area communication link in accordance with the identifier in the header based on at least the first and second qualities.

34. The apparatus of claim 33, the at least one processor further configured to attach the header to the first PPP encapsulated IP packet when the second quality is higher than a threshold.

35. The apparatus of claim 34, the at least one processor further configured to transmit the first PPP encapsulated IP packet to the device via the at least one local area communication link when the second quality is higher than the threshold.

36. The apparatus of claim 33, the at least one processor further configured to determine whether a message is received, the message indicating a preferred communication link established with the device, wherein the transmitting the first PPP encapsulated IP packet to the device via the at least one local area communication link is further based on the preferred communication link.

37. The apparatus of claim 33, wherein the first PPP encapsulated IP packet is one of a first plurality of PPP encapsulated IP packets of the first data flow transmitted from a cellular network via a logical link, the first plurality of PPP encapsulated IP packets being configured by the cellular network for transmission to the device over the cellular communication link.

38. The apparatus of claim 37, the at least one processor further configured to:
transmit a second plurality of PPP encapsulated IP packets of a second data flow to the device via the at least one local area communication link; and
map the first PPP encapsulated IP packet of the first data flow into the second data flow.

39. The apparatus of claim 38, wherein the mapping comprises attaching the header to the first PPP encapsulated IP packet.

40. The apparatus of claim 33, the at least one processor further configured to receive a signal through the cellular communication link or the at least one local area communication link, the signal comprising one or more quality measurements of at least the cellular communication link or the at least one local area communication link.

41. The apparatus of claim 33, wherein transmitting the first PPP encapsulated IP packet to the device comprises transmitting the first PPP encapsulated IP packet to an access point through a wired local area network connection, the access point configured to deliver the first PPP encapsulated IP packet to the device through a wireless local area network connection.

42. An apparatus for communication comprising:
a memory; and
at least one processor coupled to the memory and configured to:
generate a first point-to-point protocol (PPP) encapsulated Internet protocol (IP) packet to be transmitted to a cellular network, the cellular network in communication with an intermediate gateway;
establish a tunnel that receives the first PPP encapsulated IP packet and that tunnels the first PPP encapsulated packet to a PPP layer of the intermediate gateway, the tunnel employing a cellular communication link established with the intermediate gateway and at least one local area communication link established with the intermediate gateway;
determine a first quality of the cellular communication link and a second quality of the at least one local area communication link;
attach a first header to the first PPP encapsulated IP packet when the second quality is closer to a quality requirement of the first PPP encapsulated IP packet than the first quality, wherein the cellular communication link is accessible through a first interface and the at least one local area communication link is accessible through a second interface, wherein the first header includes an identifier corresponding to the second interface, and wherein the first header is used to tunnel the first PPP encapsulated IP packet to the cellular network via the at least one local area communication link; and
transmit the first PPP encapsulated IP packet to the intermediate gateway through the tunnel and via the second interface and the at least one local area communication link in accordance with the identifier in the first header based on at least the first and second qualities.

43. The apparatus of claim 42, the at least one processor further configured to attach the first header to the first PPP encapsulated IP packet when the second quality is higher than a threshold.

44. The apparatus of claim 42, the at least one processor further configured to receive, from the intermediate gateway, a second PPP encapsulated IP packet of a first data flow transmitted from the cellular network, the second PPP encapsulated IP packet being mapped into a second data flow that is received via the at least one local area communication link.

45. The apparatus of claim 44, the at least one processor further configured to remove a second header from the second PPP encapsulated IP packet, the second header being used to map the second PPP encapsulated IP packet into the second data flow.

46. The apparatus of claim 42, the at least one processor further configured to transmit the first PPP encapsulated IP packet to the intermediate gateway via the at least one local area communication link when the first quality is below a threshold.

47. The apparatus of claim 42, the at least one processor further configured to receive a signal through the cellular communication link or the at least one local area communication link, the signal comprising one or more quality measurements of at least the cellular communication link or the at least one local area communication link.

48. The apparatus of claim 42, wherein transmitting the first PPP encapsulated IP packet to the cellular network via the at least one local area communication link comprises transmitting the first PPP encapsulated IP packet to an access point through a wireless local area network connection, the access point configured to deliver the first PPP encapsulated IP packet to the cellular network at least through a wired local area network connection.

49. A non-transitory computer-readable medium comprising code for:

receiving a first point-to-point protocol (PPP) encapsulated Internet protocol (IP) packet of a first data flow for transmission to a device;

establishing a tunnel that receives the first PPP encapsulated IP packet and that tunnels the first PPP encapsulated packet to a PPP layer of the device, the tunnel employing a cellular communication link established with the device and at least one local area communication link established with the device;

determining a first quality of the cellular communication link and a second quality of the at least one local area communication link;

attaching a header to the first PPP encapsulated IP packet when the second quality is closer to a quality requirement of the first PPP encapsulated IP packet than the first quality, wherein the cellular communication link is accessible through a first interface and the at least one local area communication link is accessible through a second interface, wherein the header includes an identifier corresponding to the second interface, and wherein the header is used to tunnel the first PPP encapsulated IP packet to the device via the at least one local area communication link; and transmitting the first PPP encapsulated IP packet to the device through the tunnel and via the second interface and the at least one local area communication link in accordance with the identifier in the header based on at least the first and second qualities.

50. The non-transitory computer-readable medium of claim 49, further comprising code for attaching the header to the first PPP encapsulated IP packet when the second quality is higher than a threshold.

51. The non-transitory computer-readable medium of claim 50, further comprising code for transmitting the first PPP encapsulated IP packet to the device via the at least one local area communication link when the second quality is higher than the threshold.

52. The non-transitory computer-readable medium of claim 49, further comprising code for determining whether a message is received, the message indicating a preferred communication link established with the device, wherein the transmitting the first PPP encapsulated IP packet to the device via the at least one local area communication link is further based on the preferred communication link.

53. The non-transitory computer-readable medium of claim 49, wherein the first PPP encapsulated IP packet is one of a first plurality of PPP encapsulated IP packets of the first data flow transmitted from a cellular network via a logical link, the first plurality of PPP encapsulated IP packets being configured by the cellular network for transmission to the device over the cellular communication link.

54. The non-transitory computer-readable medium of claim 53, further comprising code for:
transmitting a second plurality of PPP encapsulated IP packets of a second data flow to the device via the at least one local area communication link; and
mapping the first PPP encapsulated IP packet of the first data flow into the second data flow.

55. The non-transitory computer-readable medium of claim 54,
wherein the mapping comprises attaching the header to the first PPP encapsulated IP packet.

56. The non-transitory computer-readable medium of claim 49, further comprising code for receiving a signal through the cellular communication link or the at least one local area communication link, the signal comprising one or more quality measurements of at least the cellular communication link or the at least one local area communication link.

57. The non-transitory computer-readable medium of claim 49, wherein transmitting the first PPP encapsulated IP packet to the device comprises transmitting the first PPP encapsulated IP packet to an access point through a wired local area network connection, the access point configured to deliver the first PPP encapsulated IP packet to the device through a wireless local area network connection.

58. A non-transitory computer-readable medium comprising code for:
generating a first point-to-point protocol (PPP) encapsulated Internet protocol (IP) packet to be transmitted to a cellular network, the cellular network in communication with an intermediate gateway;

establishing a tunnel that receives the first PPP encapsulated IP packet and that tunnels the first PPP encapsulated packet to a PPP layer of the intermediate gateway, the tunnel employing a cellular communication link established with the intermediate gateway and at least one local area communication link established with the intermediate gateway;

determining a first quality of the cellular communication link and a second quality of the at least one local area communication link;

attaching a first header to the first PPP encapsulated IP packet when the second quality is closer to a quality requirement of the first PPP encapsulated IP packet than the first quality, wherein the cellular communication link is accessible through a first interface and the at least one local area communication link is accessible through a second interface, wherein the first header includes an identifier corresponding to the second interface, and wherein the first header is used to tunnel the first PPP encapsulated IP packet to the cellular network via the at least one local area communication link; and transmitting the first PPP encapsulated IP packet to the intermediate gateway through the tunnel and via the second interface and the at least one local area communication link in accordance with the identifier in the first header based on at least the first and second qualities.

59. The non-transitory computer-readable medium of claim 58, the computer-readable medium further comprising code for attaching the first header to the first PPP encapsulated IP packet when the second quality is higher than a threshold.

60. The non-transitory computer-readable medium of claim 58, the computer-readable medium further comprising code for receiving, from the intermediate gateway, a second PPP encapsulated IP packet of a first data flow transmitted from the cellular network, the second PPP encapsulated IP packet being mapped into a second data flow that is received via the at least one local area communication link.

61. The non-transitory computer-readable medium of claim 60, the computer-readable medium further comprising code for removing a second header from the second PPP encapsulated IP packet, the second header being used to map the second PPP encapsulated IP packet into the second data flow.

62. The non-transitory computer-readable medium of claim 58, the computer-readable medium further comprising code for transmitting the first PPP encapsulated IP packet to the intermediate gateway via the at least one local area communication link when the first quality is below a threshold.

63. The non-transitory computer-readable medium of claim 58, the computer-readable medium further comprising code for receiving a signal through the cellular communication link or the at least one local area communication link, the signal comprising one or more quality measurements of at least the cellular communication link or the at least one local area communication link.

64. The non-transitory computer-readable medium of claim 58, wherein transmitting the first PPP encapsulated IP packet to the cellular network via the at least one local area communication link comprises transmitting the first PPP encapsulated IP packet to an access point through a wireless local area network connection, the access point configured to deliver the first PPP encapsulated IP packet to the cellular network at least through a wired local area network connection.

* * * * *